US012355770B2

(12) United States Patent
Cirello Filho et al.

(10) Patent No.: US 12,355,770 B2
(45) Date of Patent: Jul. 8, 2025

(54) IDENTITY AND ACTIVITY BASED NETWORK SECURITY POLICIES

(71) Applicant: strongDM, Inc., Palo Alto, CA (US)

(72) Inventors: Carlos Ulderico Cirello Filho, South San Francisco, CA (US); Philip D. Hassey, Rye, CO (US); Kevin David Jamieson, North Vancouver (CA); Justin Allan McCarthy, Redwood City, CA (US); Amol Kabe, Palo Alto, CA (US); Karim Fanous, Seattle, WA (US)

(73) Assignee: strongDM, Inc., Palo Alto, CA (US)

( * ) Notice: Subject to any disclaimer, the term of this patent is extended or adjusted under 35 U.S.C. 154(b) by 0 days.

(21) Appl. No.: 18/740,622

(22) Filed: Jun. 12, 2024

(65) Prior Publication Data
US 2025/0112923 A1    Apr. 3, 2025

Related U.S. Application Data

(60) Provisional application No. 63/542,220, filed on Oct. 3, 2023.

(51) Int. Cl.
*H04L 9/40* (2022.01)
*G06F 9/455* (2018.01)

(52) U.S. Cl.
CPC .......... *H04L 63/10* (2013.01); *G06F 9/45558* (2013.01); *H04L 63/029* (2013.01);
(Continued)

(58) Field of Classification Search
None
See application file for complete search history.

(56) References Cited

U.S. PATENT DOCUMENTS 5,867,494 A * 2/1999 Krishnaswamy ... H04M 7/0027
                                                         379/114.15
5,867,495 A * 2/1999 Elliott ................. H04L 12/1485
                                                         379/93.07
(Continued)

FOREIGN PATENT DOCUMENTS

CA    2847507 A1    11/2014
EP    3422236 A1 *  1/2019  ........... G06F 21/335

OTHER PUBLICATIONS

Uriarte et al "Expressive Policy-Based Access Control for Resource-Constrained Devices," Special Section on Security and Privacy in Applications and Services for Future Internet of Things, IEEE Access, pp. 15-46 (Year: 2017).*

(Continued)

*Primary Examiner* — Luu T Pham
*Assistant Examiner* — James J Wilcox
(74) *Attorney, Agent, or Firm* — John W. Branch; Branch Partners PLLC

(57) ABSTRACT

Embodiments are directed to managing access to network resources. A first mesh agent may be configured to provide a client with access to a resource via an overlay network. The first mesh agent may determine an identity and an activity associated with requests such that the identity corresponds to an entity that may be authenticated to access the overlay network and the resource. A policy container associated with the activity may be determined based on characteristics of the requests such that the policy container may include policies associated with the activity. The requests may be validated based on the policies included in the policy container such that the validated requests may be forwarded to the resource and invalidated requests may be discarded and such that persistence of the connection may be maintained during the validation.

18 Claims, 13 Drawing Sheets

(52) U.S. Cl.
CPC .......... *H04L 63/08* (2013.01); *H04L 63/1425* (2013.01); *H04L 63/20* (2013.01); *G06F 2009/45587* (2013.01); *G06F 2009/45595* (2013.01)

(56) References Cited

U.S. PATENT DOCUMENTS

| | | | |
|---|---|---|---|
| 5,884,794 A * | 3/1999 | Calhoun | B65D 88/126 220/1.5 |
| 5,987,247 A * | 11/1999 | Lau | G06F 8/24 717/100 |
| 6,335,927 B1 * | 1/2002 | Elliott | H04L 41/5054 370/352 |
| 6,345,386 B1 * | 2/2002 | Delo | G06F 8/61 717/176 |
| 6,418,447 B1 * | 7/2002 | Frey | G06F 16/289 |
| 6,418,554 B1 * | 7/2002 | Delo | G06F 8/61 717/174 |
| 6,442,564 B1 * | 8/2002 | Frey | G06F 9/465 |
| 6,463,470 B1 * | 10/2002 | Mohaban | H04L 47/2408 709/224 |
| 6,466,932 B1 * | 10/2002 | Dennis | G06F 21/62 709/227 |
| 6,502,103 B1 * | 12/2002 | Frey | G06F 9/465 |
| 6,505,210 B1 * | 1/2003 | Frey | G06F 9/465 |
| 6,523,166 B1 * | 2/2003 | Mishra | G06F 8/61 707/999.107 |
| 6,553,384 B1 * | 4/2003 | Frey | H04L 67/1001 |
| 6,560,609 B1 * | 5/2003 | Frey | G06F 9/465 |
| 6,567,818 B1 * | 5/2003 | Frey | G06F 9/465 709/204 |
| 6,594,671 B1 * | 7/2003 | Aman | G06F 9/465 |
| 6,836,794 B1 * | 12/2004 | Lucovsky | G06F 8/61 717/177 |
| 6,909,708 B1 * | 6/2005 | Krishnaswamy | H04L 65/1104 379/93.07 |
| 7,165,107 B2 * | 1/2007 | Pouyoul | H04L 61/00 709/224 |
| 7,174,361 B1 * | 2/2007 | Paas | G06F 9/547 715/740 |
| 7,233,569 B1 | 6/2007 | Swallow | |
| 7,752,466 B2 | 7/2010 | Ginter et al. | |
| 7,752,487 B1 * | 7/2010 | Feeser | G06F 11/1464 714/4.11 |
| 7,788,399 B2 * | 8/2010 | Brouk | H04L 67/63 370/216 |
| 7,882,247 B2 * | 2/2011 | Sturniolo | H04L 63/164 709/228 |
| 7,886,339 B2 | 2/2011 | Keohane et al. | |
| 8,102,814 B2 | 1/2012 | Rahman et al. | |
| 8,135,815 B2 | 3/2012 | Mayer | |
| 8,165,905 B2 * | 4/2012 | Yamamoto | G06Q 10/087 705/7.12 |
| 8,656,154 B1 * | 2/2014 | Kailash | H04L 63/0807 713/168 |
| 8,656,478 B1 * | 2/2014 | Forristal | H04L 63/0421 726/11 |
| 8,806,593 B1 * | 8/2014 | Raphel | H04L 63/0892 726/6 |
| 8,817,668 B2 * | 8/2014 | Sekaran | H04L 65/4038 370/522 |
| 8,869,259 B1 * | 10/2014 | Udupa | H04L 63/20 726/10 |
| 9,002,805 B1 * | 4/2015 | Barber | G06F 16/215 707/692 |
| 9,026,079 B2 * | 5/2015 | Raleigh | H04L 67/306 455/406 |
| 9,052,942 B1 * | 6/2015 | Barber | G06F 3/0604 |
| 9,063,946 B1 * | 6/2015 | Barber | G06F 16/178 |
| 9,082,402 B2 | 7/2015 | Yadgar et al. | |
| 9,176,758 B2 | 11/2015 | Swaminathan | |
| 9,178,793 B1 | 11/2015 | Marlow | |
| 9,239,834 B2 | 1/2016 | Donabedian et al. | |
| 9,300,635 B1 * | 3/2016 | Gilde | H04L 63/0485 |
| 9,355,060 B1 * | 5/2016 | Barber | H04L 67/1097 |
| 9,369,433 B1 * | 6/2016 | Paul | H04L 63/029 |
| 9,380,456 B1 * | 6/2016 | Lee | H04W 12/088 |
| 9,380,523 B1 * | 6/2016 | Mijar | H04W 48/18 |
| 9,380,562 B1 * | 6/2016 | Vetter | H04L 63/08 |
| 9,417,917 B1 * | 8/2016 | Barber | G06F 9/5005 |
| 9,471,775 B1 * | 10/2016 | Wagner | G06F 9/45533 |
| 9,491,157 B1 * | 11/2016 | Amdahl | H04L 67/56 |
| 9,521,115 B1 * | 12/2016 | Woolward | H04L 63/0263 |
| 9,560,081 B1 * | 1/2017 | Woolward | G06F 9/45558 |
| 9,584,523 B2 | 2/2017 | Santhiveeran | |
| 9,619,673 B1 * | 4/2017 | Vetter | G06F 21/83 |
| 9,632,828 B1 | 4/2017 | Mehta et al. | |
| 9,658,983 B1 * | 5/2017 | Barber | G06F 16/2474 |
| 9,667,703 B1 * | 5/2017 | Vetter | A63F 13/30 |
| 9,697,629 B1 * | 7/2017 | Vetter | G06T 11/60 |
| 9,727,522 B1 * | 8/2017 | Barber | G06F 9/5016 |
| 9,729,581 B1 * | 8/2017 | Skene | H04L 63/20 |
| 9,762,619 B1 * | 9/2017 | Vaidya | H04L 63/20 |
| 9,787,639 B1 * | 10/2017 | Sun | H04L 63/0263 |
| 9,800,517 B1 | 10/2017 | Anderson | |
| 9,819,593 B1 * | 11/2017 | Vetter | G06F 21/83 |
| 9,825,911 B1 * | 11/2017 | Brandwine | H04L 63/20 |
| 9,882,767 B1 * | 1/2018 | Foxhoven | H04L 61/4552 |
| 9,948,644 B2 * | 4/2018 | Brouk | H04L 63/0884 |
| 10,033,766 B2 * | 7/2018 | Gupta | H04L 63/20 |
| 10,063,595 B1 * | 8/2018 | Qureshi | H04L 63/0471 |
| 10,075,334 B1 | 9/2018 | Kozura et al. | |
| 10,089,476 B1 * | 10/2018 | Roth | G06Q 20/14 |
| 10,104,185 B1 * | 10/2018 | Sharifi Mehr | G06F 21/53 |
| 10,110,593 B2 | 10/2018 | Karroumi et al. | |
| 10,116,679 B1 * | 10/2018 | Wu | H04L 63/102 |
| 10,117,098 B1 | 10/2018 | Naguthanawala et al. | |
| 10,154,065 B1 * | 12/2018 | Buchler | G06F 21/6218 |
| 10,158,545 B1 * | 12/2018 | Marrone | H04L 67/1001 |
| 10,292,033 B2 | 5/2019 | Beyer et al. | |
| 10,348,767 B1 * | 7/2019 | Lee | H04L 63/0236 |
| 10,360,010 B1 * | 7/2019 | Maehler | G07F 19/207 |
| 10,361,859 B2 * | 7/2019 | Clark | H04L 67/104 |
| 10,382,401 B1 * | 8/2019 | Lee | H04L 63/166 |
| 10,395,042 B2 * | 8/2019 | Agarwal | H04W 12/03 |
| 10,409,582 B1 * | 9/2019 | Maehler | G06F 8/65 |
| 10,476,745 B1 * | 11/2019 | McCormick | H04L 41/0895 |
| 10,505,989 B2 * | 12/2019 | Hankins | H04L 63/0272 |
| 10,511,590 B1 * | 12/2019 | Bosch | H04L 63/20 |
| 10,511,614 B1 * | 12/2019 | Aziz | H04L 63/1416 |
| 10,516,667 B1 * | 12/2019 | Roth | H04L 63/08 |
| 10,579,362 B1 * | 3/2020 | Maehler | G06F 8/65 |
| 10,579,403 B2 * | 3/2020 | Antony | G06F 9/45533 |
| 10,587,621 B2 * | 3/2020 | Ponnuswamy | H04L 63/20 |
| 10,587,644 B1 * | 3/2020 | Stolte | H04L 63/1433 |
| 10,609,041 B1 * | 3/2020 | Wilczynski | G06F 21/62 |
| 10,645,562 B2 | 5/2020 | Beyer et al. | |
| 10,659,533 B1 * | 5/2020 | Zhao | G06F 12/0862 |
| 10,728,117 B1 * | 7/2020 | Sharma | H04L 41/5067 |
| 10,735,263 B1 | 8/2020 | Mcalary et al. | |
| 10,764,244 B1 * | 9/2020 | Mestery | H04L 63/0281 |
| 10,827,020 B1 * | 11/2020 | Cao | H04L 67/561 |
| 10,917,438 B2 * | 2/2021 | Gandham | H04L 67/12 |
| 10,944,691 B1 * | 3/2021 | Raut | H04L 45/64 |
| 10,958,649 B2 * | 3/2021 | Delcourt | G06F 21/554 |
| 10,999,326 B1 * | 5/2021 | Pollitt | H04L 63/20 |
| 11,038,861 B2 * | 6/2021 | Agarwal | H04L 63/06 |
| 11,070,594 B1 * | 7/2021 | Marrone | H04L 12/66 |
| 11,075,747 B1 | 7/2021 | Holsman | |
| 11,075,923 B1 * | 7/2021 | Srinivasan | H04L 67/61 |
| 11,089,047 B1 * | 8/2021 | Kaushal | H04L 67/10 |
| 11,102,076 B1 * | 8/2021 | Pieczul | H04L 63/20 |
| 11,102,147 B2 | 8/2021 | Mehta et al. | |
| 11,153,190 B1 * | 10/2021 | Mahajan | H04L 67/148 |
| 11,163,614 B1 * | 11/2021 | Francisco | G06F 9/5088 |
| 11,228,945 B2 * | 1/2022 | Yang | H04W 4/40 |
| 11,233,872 B2 * | 1/2022 | Shribman | H04L 67/567 |
| 11,249,809 B1 * | 2/2022 | Tang | G06F 9/5011 |
| 11,290,143 B1 | 3/2022 | Sternowski | |
| 11,303,643 B1 * | 4/2022 | Li | H04L 63/1416 |
| 11,310,650 B2 * | 4/2022 | Zhou | H04W 8/02 |
| 11,316,822 B1 | 4/2022 | Gawade et al. | |

(56) References Cited

U.S. PATENT DOCUMENTS

| | | | |
|---|---|---|---|
| 11,323,919 B1 | 5/2022 | Parulkar et al. | |
| 11,375,300 B2* | 6/2022 | Sagie | H04Q 11/0071 |
| 11,412,051 B1 | 8/2022 | Chiganmi et al. | |
| 11,424,946 B2* | 8/2022 | Shribman | H04W 4/80 |
| 11,431,497 B1 | 8/2022 | Liguori et al. | |
| 11,502,908 B1* | 11/2022 | Singh | H04L 63/14 |
| 11,521,444 B1 | 12/2022 | Badik et al. | |
| 11,528,147 B2 | 12/2022 | Madisetti et al. | |
| 11,538,287 B2* | 12/2022 | Fang | H04L 67/125 |
| 11,546,323 B1* | 1/2023 | Jones | H04L 63/083 |
| 11,546,763 B1 | 1/2023 | Filho et al. | |
| 11,599,714 B2 | 3/2023 | Munro et al. | |
| 11,599,841 B2 | 3/2023 | Anisingaraju et al. | |
| 11,620,103 B2 | 4/2023 | Graham et al. | |
| 11,632,669 B2* | 4/2023 | Xu | H04W 48/18 370/338 |
| 11,657,145 B2* | 5/2023 | Cristina | G06F 21/53 726/25 |
| 11,729,620 B1 | 8/2023 | Filho et al. | |
| 11,736,531 B1* | 8/2023 | Cirello Filho | H04L 63/0272 |
| 11,765,159 B1* | 9/2023 | Crawford | H04L 63/0853 726/4 |
| 11,765,207 B1 | 9/2023 | McCarthy et al. | |
| 11,784,999 B1 | 10/2023 | Jones et al. | |
| 11,831,511 B1* | 11/2023 | Zhou | H04L 41/042 |
| 11,861,221 B1* | 1/2024 | Richardson | G06F 3/0604 |
| 11,916,885 B1* | 2/2024 | Cirello Filho | H04L 63/10 |
| 11,916,968 B1 | 2/2024 | Cirello Filho et al. | |
| 11,930,045 B1* | 3/2024 | Baker | H04L 63/0245 |
| 11,954,219 B1* | 4/2024 | Makmal | H04L 9/3247 |
| 11,973,752 B2 | 4/2024 | Crawford et al. | |
| 12,028,321 B1 | 7/2024 | Cirello Filho et al. | |
| 12,063,148 B2* | 8/2024 | Dabell | H04L 41/24 |
| 12,063,218 B2* | 8/2024 | Wilczynski | H04L 63/104 |
| 12,063,550 B2* | 8/2024 | Qiao | H04W 28/0967 |
| 12,177,097 B2* | 12/2024 | Gupta | H04L 63/1441 |
| 12,184,667 B2* | 12/2024 | Chacko | H04L 63/1416 |
| 12,184,700 B2* | 12/2024 | Raleigh | H04L 41/5003 |
| 2002/0099952 A1* | 7/2002 | Lambert | G06F 21/53 726/27 |
| 2002/0133534 A1* | 9/2002 | Forslow | H04W 36/0019 709/200 |
| 2002/0140738 A1* | 10/2002 | West | G06F 9/451 715/810 |
| 2002/0149623 A1* | 10/2002 | West | G06F 9/451 715/765 |
| 2003/0041141 A1* | 2/2003 | Abdelaziz | G06F 9/544 709/223 |
| 2003/0058286 A1* | 3/2003 | Dando | G06F 9/451 715/853 |
| 2003/0093465 A1* | 5/2003 | Banerjee | H04L 67/10 709/225 |
| 2003/0145317 A1* | 7/2003 | Chamberlain | G06F 8/61 717/177 |
| 2003/0177182 A1* | 9/2003 | Clark | G06F 9/5033 709/203 |
| 2004/0019898 A1* | 1/2004 | Frey | H04L 61/00 719/330 |
| 2004/0064512 A1* | 4/2004 | Arora | H04L 63/08 709/206 |
| 2004/0064568 A1* | 4/2004 | Arora | H04L 67/306 709/228 |
| 2004/0064693 A1* | 4/2004 | Pabla | H04L 67/1076 713/168 |
| 2004/0088348 A1* | 5/2004 | Yeager | H04L 67/104 709/202 |
| 2004/0133640 A1* | 7/2004 | Yeager | H04L 67/104 709/204 |
| 2004/0184070 A1* | 9/2004 | Kiraly | G06F 3/1288 358/1.15 |
| 2005/0022185 A1* | 1/2005 | Romero | G06F 11/3466 714/E11.2 |
| 2005/0132227 A1* | 6/2005 | Reasor | G06F 21/50 726/4 |
| 2005/0164650 A1 | 7/2005 | Johnson | |
| 2005/0209876 A1 | 9/2005 | Kennis et al. | |
| 2006/0074876 A1* | 4/2006 | Kakivaya | G06F 16/10 |
| 2006/0136928 A1* | 6/2006 | Crawford | G06F 9/5083 718/105 |
| 2006/0177005 A1* | 8/2006 | Shaffer | H04M 3/537 379/67.1 |
| 2006/0177024 A1* | 8/2006 | Frifeldt | H04L 51/00 379/88.22 |
| 2006/0177025 A1* | 8/2006 | Frifeldt | H04L 51/56 379/88.22 |
| 2006/0190991 A1 | 8/2006 | Iyer | |
| 2006/0200856 A1* | 9/2006 | Salowey | H04L 9/32 726/5 |
| 2006/0212487 A1 | 9/2006 | Kennis et al. | |
| 2006/0233166 A1* | 10/2006 | Bou-Diab | H04L 63/08 370/389 |
| 2006/0233180 A1* | 10/2006 | Serghi | H04L 9/40 370/401 |
| 2006/0235973 A1* | 10/2006 | McBride | H04L 67/53 709/226 |
| 2006/0240824 A1 | 10/2006 | Henderson et al. | |
| 2006/0265708 A1* | 11/2006 | Blanding | G06F 8/61 717/174 |
| 2006/0265758 A1* | 11/2006 | Khandelwal | H04L 9/08 726/27 |
| 2006/0288204 A1 | 12/2006 | Sood et al. | |
| 2007/0009104 A1 | 1/2007 | Renkis | |
| 2007/0014413 A1* | 1/2007 | Oliveira | H04L 63/06 380/278 |
| 2007/0033273 A1* | 2/2007 | White | G06F 8/30 709/223 |
| 2007/0124797 A1* | 5/2007 | Gupta | H04L 67/02 726/1 |
| 2007/0162359 A1* | 7/2007 | Gokhale | G06Q 10/08 705/28 |
| 2007/0220009 A1* | 9/2007 | Morris | G06F 21/6218 |
| 2007/0293210 A1* | 12/2007 | Strub | H04L 63/102 455/411 |
| 2007/0294209 A1* | 12/2007 | Strub | H04L 67/535 |
| 2007/0294253 A1* | 12/2007 | Strub | H04L 63/105 707/999.009 |
| 2008/0072281 A1* | 3/2008 | Willis | H04L 63/102 726/1 |
| 2008/0072282 A1* | 3/2008 | Willis | H04L 63/102 726/1 |
| 2008/0082823 A1* | 4/2008 | Starrett | H04L 9/083 713/171 |
| 2008/0144502 A1* | 6/2008 | Jackowski | H04L 47/35 370/235 |
| 2008/0184336 A1* | 7/2008 | Sarukkai | G06F 21/6218 726/1 |
| 2008/0201454 A1* | 8/2008 | Soffer | H04L 41/00 709/220 |
| 2008/0229383 A1* | 9/2008 | Buss | G06Q 20/382 707/999.1 |
| 2008/0256357 A1* | 10/2008 | Iyengar | G06F 21/31 713/155 |
| 2008/0313699 A1* | 12/2008 | Starostin | H04L 63/10 726/1 |
| 2009/0037607 A1 | 2/2009 | Farinacci et al. | |
| 2009/0049509 A1* | 2/2009 | Chan | G06F 21/604 726/1 |
| 2009/0063381 A1* | 3/2009 | Chan | G06Q 10/10 706/47 |
| 2009/0083336 A1* | 3/2009 | Srinivasan | G06F 11/1448 |
| 2009/0164663 A1 | 6/2009 | Ransom et al. | |
| 2009/0216910 A1* | 8/2009 | Duchesneau | F28D 15/06 709/250 |
| 2009/0222559 A1 | 9/2009 | Anipko et al. | |
| 2010/0037311 A1* | 2/2010 | He | H04L 63/20 709/227 |
| 2010/0131650 A1 | 5/2010 | Pok et al. | |

(56) References Cited

U.S. PATENT DOCUMENTS

| | | | |
|---|---|---|---|
| 2010/0132013 A1* | 5/2010 | van Riel | G06F 21/53 726/1 |
| 2010/0154025 A1* | 6/2010 | Esteve Balducci | H04L 63/20 726/1 |
| 2010/0161632 A1* | 6/2010 | Rosen | G06F 9/44526 707/E17.014 |
| 2010/0192212 A1* | 7/2010 | Raleigh | H04L 67/63 726/7 |
| 2010/0217853 A1* | 8/2010 | Alexander | H04L 63/20 709/223 |
| 2010/0250497 A1* | 9/2010 | Redlich | G06Q 10/06 707/661 |
| 2010/0262717 A1* | 10/2010 | Critchley | H04L 67/1065 709/251 |
| 2011/0002333 A1* | 1/2011 | Karuppiah | H04L 43/0864 370/390 |
| 2011/0106757 A1* | 5/2011 | Pickney | G06F 16/184 707/E17.054 |
| 2011/0106770 A1* | 5/2011 | McDonald | H04L 67/025 707/E17.054 |
| 2011/0106771 A1* | 5/2011 | McDonald | G06F 16/182 707/663 |
| 2011/0106802 A1* | 5/2011 | Pinkney | G06F 16/184 707/E17.054 |
| 2011/0167474 A1* | 7/2011 | Sinha | G06F 21/51 726/1 |
| 2011/0225311 A1 | 9/2011 | Liu et al. | |
| 2012/0084438 A1* | 4/2012 | Raleigh | H04L 63/1425 709/224 |
| 2012/0102050 A1* | 4/2012 | Button | G06N 5/022 707/E17.014 |
| 2012/0185913 A1* | 7/2012 | Martinez | G06F 9/45558 726/1 |
| 2012/0216240 A1* | 8/2012 | Gottumukkala | G06F 21/6218 726/1 |
| 2012/0240183 A1* | 9/2012 | Sinha | H04L 67/306 726/1 |
| 2012/0260307 A1* | 10/2012 | Sambamurthy | H04L 63/105 726/1 |
| 2012/0278293 A1* | 11/2012 | Bulkowski | G06F 16/27 707/703 |
| 2012/0304265 A1 | 11/2012 | Richter et al. | |
| 2013/0031157 A1* | 1/2013 | McKee | H04L 67/125 709/201 |
| 2013/0125112 A1* | 5/2013 | Mittal | G06F 9/45558 718/1 |
| 2013/0173794 A1 | 7/2013 | Agerbak et al. | |
| 2013/0198558 A1 | 8/2013 | Rao et al. | |
| 2013/0227714 A1* | 8/2013 | Gula | H04L 63/1408 726/32 |
| 2013/0239192 A1* | 9/2013 | Linga | H04L 63/061 726/3 |
| 2013/0268260 A1 | 10/2013 | Lundberg et al. | |
| 2013/0268740 A1* | 10/2013 | Holt | G06F 21/00 711/163 |
| 2013/0298183 A1* | 11/2013 | McGrath | H04L 63/10 718/1 |
| 2014/0044265 A1 | 2/2014 | Kocher et al. | |
| 2014/0057676 A1 | 2/2014 | Lord et al. | |
| 2014/0136970 A1 | 5/2014 | Xiao | |
| 2014/0183269 A1* | 7/2014 | Glaser | G06K 19/07701 235/492 |
| 2014/0195818 A1* | 7/2014 | Neumann | G06F 21/6209 713/189 |
| 2014/0248852 A1* | 9/2014 | Raleigh | H04W 12/068 455/566 |
| 2014/0282900 A1* | 9/2014 | Wang | H04L 63/04 726/4 |
| 2014/0289794 A1* | 9/2014 | Raleigh | H04L 63/20 726/1 |
| 2014/0373124 A1* | 12/2014 | Rubin | H04W 12/08 726/7 |
| 2014/0376378 A1* | 12/2014 | Rubin | H04W 28/0215 370/235 |
| 2015/0063202 A1* | 3/2015 | Mazzarella | H04L 65/1093 370/316 |
| 2015/0079945 A1* | 3/2015 | Rubin | H04W 28/021 455/411 |
| 2015/0082374 A1* | 3/2015 | Dobson | H04W 12/086 726/1 |
| 2015/0089566 A1* | 3/2015 | Chesla | H04L 63/1441 726/1 |
| 2015/0089575 A1* | 3/2015 | Vepa | H04L 63/20 726/1 |
| 2015/0127949 A1 | 5/2015 | Patil et al. | |
| 2015/0128205 A1* | 5/2015 | Mahaffey | H04L 63/105 726/1 |
| 2015/0135277 A1* | 5/2015 | Vij | H04L 63/0892 726/4 |
| 2015/0135300 A1 | 5/2015 | Ford | |
| 2015/0143456 A1* | 5/2015 | Raleigh | H04L 63/20 726/1 |
| 2015/0143504 A1* | 5/2015 | Desai | H04L 63/0245 709/224 |
| 2015/0169871 A1* | 6/2015 | Achutha | G06F 21/52 726/1 |
| 2015/0188949 A1* | 7/2015 | Mahaffey | H04W 12/03 726/1 |
| 2015/0208273 A1 | 7/2015 | Raleigh et al. | |
| 2015/0281079 A1* | 10/2015 | Fan | H04L 12/6418 370/392 |
| 2015/0281952 A1 | 10/2015 | Patil et al. | |
| 2015/0282058 A1* | 10/2015 | Forssell | H04W 48/16 455/552.1 |
| 2015/0301824 A1* | 10/2015 | Patton | G06F 16/00 717/122 |
| 2015/0309849 A1* | 10/2015 | Lau | G06F 21/52 719/329 |
| 2015/0310025 A1* | 10/2015 | Rathgeber | G06F 16/125 707/662 |
| 2015/0319182 A1* | 11/2015 | Natarajan | H04L 63/1458 726/23 |
| 2015/0326613 A1* | 11/2015 | Devarajan | H04L 63/20 726/1 |
| 2015/0350912 A1* | 12/2015 | Head | H04L 63/08 726/4 |
| 2015/0370793 A1* | 12/2015 | Chen | G06F 16/93 707/695 |
| 2015/0370846 A1* | 12/2015 | Zhou | G06F 16/955 707/689 |
| 2015/0382198 A1 | 12/2015 | Kashef et al. | |
| 2016/0014669 A1 | 1/2016 | Patil et al. | |
| 2016/0014818 A1 | 1/2016 | Reitsma et al. | |
| 2016/0036816 A1* | 2/2016 | Srinivasan | H04L 63/1425 726/1 |
| 2016/0036855 A1* | 2/2016 | Gangadharappa | H04L 67/562 726/1 |
| 2016/0036861 A1* | 2/2016 | Mattes | H04L 63/20 726/1 |
| 2016/0057166 A1* | 2/2016 | Chesla | H04L 63/1416 726/22 |
| 2016/0065618 A1* | 3/2016 | Banerjee | G06F 9/455 726/1 |
| 2016/0078236 A1* | 3/2016 | Chesla | G06F 21/604 726/1 |
| 2016/0080128 A1 | 3/2016 | Hebron | |
| 2016/0085841 A1* | 3/2016 | Dorfman | G06F 9/468 707/738 |
| 2016/0147529 A1* | 5/2016 | Coleman | G06F 8/71 717/120 |
| 2016/0173501 A1 | 6/2016 | Brown | |
| 2016/0180102 A1 | 6/2016 | Kim et al. | |
| 2016/0191545 A1 | 6/2016 | Nanda et al. | |
| 2016/0212237 A1* | 7/2016 | Nishijima | G06F 9/45558 |
| 2016/0219024 A1* | 7/2016 | Verzun | H04L 9/34 |
| 2016/0224360 A1* | 8/2016 | Wagner | G06F 9/45558 |
| 2016/0224785 A1* | 8/2016 | Wagner | G06F 21/552 |

(56) References Cited

U.S. PATENT DOCUMENTS

| | | | |
|---|---|---|---|
| 2016/0255051 A1* | 9/2016 | Williams | H04L 63/102 |
| | | | 726/1 |
| 2016/0262021 A1 | 9/2016 | Lee et al. | |
| 2016/0277447 A1* | 9/2016 | Pope | H04L 63/06 |
| 2016/0294826 A1 | 10/2016 | Han et al. | |
| 2016/0314355 A1 | 10/2016 | Laska et al. | |
| 2016/0337474 A1* | 11/2016 | Rao | H04L 41/12 |
| 2016/0359872 A1* | 12/2016 | Yadav | H04L 63/1408 |
| 2016/0359914 A1* | 12/2016 | Deen | H04L 67/12 |
| 2016/0378846 A1* | 12/2016 | Luse | G06F 16/122 |
| | | | 707/740 |
| 2016/0380909 A1* | 12/2016 | Antony | H04L 47/805 |
| | | | 370/236 |
| 2016/0381699 A1* | 12/2016 | Rubin | H04L 1/00 |
| | | | 370/329 |
| 2017/0005790 A1* | 1/2017 | Brockmann | H04L 9/3234 |
| 2017/0010826 A1* | 1/2017 | Basham | G06F 3/0619 |
| 2017/0011078 A1* | 1/2017 | Gerrard | G06F 16/22 |
| 2017/0061006 A1* | 3/2017 | Hildebrand | H04L 67/1097 |
| 2017/0061956 A1 | 3/2017 | Sarikaya et al. | |
| 2017/0078721 A1* | 3/2017 | Brockmann | G06F 21/1086 |
| 2017/0093923 A1* | 3/2017 | Duan | G06F 11/2028 |
| 2017/0103440 A1 | 4/2017 | Xing et al. | |
| 2017/0111368 A1 | 4/2017 | Hibbert et al. | |
| 2017/0126734 A1 | 5/2017 | Harney | |
| 2017/0134422 A1* | 5/2017 | Shieh | H04L 63/1408 |
| 2017/0142096 A1* | 5/2017 | Reddy | H04L 12/1827 |
| 2017/0142810 A1 | 5/2017 | Cho | |
| 2017/0149614 A1* | 5/2017 | Zheng | H04L 45/021 |
| 2017/0149843 A1* | 5/2017 | Amulothu | H04L 63/083 |
| 2017/0171154 A1* | 6/2017 | Brown | H04L 43/10 |
| 2017/0171245 A1* | 6/2017 | Lee | G06F 16/958 |
| 2017/0177222 A1* | 6/2017 | Singh | H04L 67/1097 |
| 2017/0177892 A1* | 6/2017 | Tingstrom | H04W 12/086 |
| 2017/0206207 A1* | 7/2017 | Bondurant | G06F 16/183 |
| 2017/0212830 A1* | 7/2017 | Thomas | G06F 11/3668 |
| 2017/0223024 A1* | 8/2017 | Desai | H04L 63/20 |
| 2017/0237747 A1* | 8/2017 | Quinn | G06F 21/602 |
| | | | 726/29 |
| 2017/0244606 A1* | 8/2017 | Htay | H04L 41/40 |
| 2017/0250953 A1* | 8/2017 | Jain | G06F 21/552 |
| 2017/0257357 A1* | 9/2017 | Wang | H04L 9/12 |
| 2017/0279803 A1* | 9/2017 | Desai | H04L 67/02 |
| 2017/0279971 A1* | 9/2017 | Raleigh | H04W 60/06 |
| 2017/0331859 A1* | 11/2017 | Bansal | H04L 63/029 |
| 2017/0332238 A1* | 11/2017 | Bansal | H04L 67/125 |
| 2017/0339561 A1 | 11/2017 | Wennemyr et al. | |
| 2017/0353433 A1* | 12/2017 | Antony | H04L 49/70 |
| 2017/0353483 A1* | 12/2017 | Weith | G06F 16/23 |
| 2017/0353496 A1* | 12/2017 | Pai | H04L 63/10 |
| 2017/0359220 A1* | 12/2017 | Weith | G06F 16/285 |
| 2017/0364505 A1 | 12/2017 | Sarikaya et al. | |
| 2017/0364748 A1* | 12/2017 | Maji | G06V 20/20 |
| 2017/0372087 A1 | 12/2017 | Lee | |
| 2017/0374032 A1* | 12/2017 | Woolward | H04L 63/0263 |
| 2017/0374101 A1* | 12/2017 | Woolward | H04L 63/0263 |
| 2018/0027009 A1* | 1/2018 | Santos | H04L 63/1441 |
| | | | 726/25 |
| 2018/0032258 A1* | 2/2018 | Edwards | G06F 3/067 |
| 2018/0035126 A1* | 2/2018 | Lee | H04N 19/503 |
| 2018/0041467 A1* | 2/2018 | Vats | H04L 9/0891 |
| 2018/0041598 A1* | 2/2018 | Vats | H04L 63/104 |
| 2018/0061158 A1 | 3/2018 | Greene | |
| 2018/0069702 A1* | 3/2018 | Ayyadevara | H04L 9/14 |
| 2018/0083915 A1* | 3/2018 | Medam | G06F 16/2246 |
| 2018/0083944 A1* | 3/2018 | Vats | H04L 63/0815 |
| 2018/0091583 A1* | 3/2018 | Collins | H04L 41/5003 |
| 2018/0101422 A1* | 4/2018 | Flanigan | G06F 21/6209 |
| 2018/0109498 A1* | 4/2018 | Singh | H04L 67/02 |
| 2018/0115520 A1* | 4/2018 | Neuman | H04L 63/0272 |
| 2018/0115523 A1* | 4/2018 | Subbarayan | G06N 20/00 |
| 2018/0115585 A1* | 4/2018 | Rubakha | G06F 21/53 |
| 2018/0121110 A1* | 5/2018 | Sawhney | G06F 3/0685 |
| 2018/0121129 A1* | 5/2018 | Sawhney | G06F 3/0685 |
| 2018/0123957 A1 | 5/2018 | Chen et al. | |
| 2018/0159701 A1* | 6/2018 | Krause | H04L 61/2514 |
| 2018/0167373 A1 | 6/2018 | Anderson et al. | |
| 2018/0167415 A1* | 6/2018 | Khan | H04W 12/08 |
| 2018/0176262 A1* | 6/2018 | Kavi | H04L 63/1408 |
| 2018/0196680 A1* | 7/2018 | Wang | G06F 9/445 |
| 2018/0210801 A1* | 7/2018 | Wu | H04L 43/20 |
| 2018/0218148 A1* | 8/2018 | D'Errico | G06F 21/53 |
| 2018/0218149 A1* | 8/2018 | Jacobs | G06F 21/56 |
| 2018/0220472 A1* | 8/2018 | Schopp | H04L 63/0428 |
| 2018/0233141 A1 | 8/2018 | Solomon et al. | |
| 2018/0255591 A1* | 9/2018 | Valicherla | H04L 12/4641 |
| 2018/0270732 A1* | 9/2018 | Garcia Martin | H04W 48/04 |
| 2018/0288026 A1 | 10/2018 | Callaghan | |
| 2018/0293024 A1* | 10/2018 | Baptist | G06F 3/0659 |
| 2018/0295036 A1* | 10/2018 | Krishnamurthy | H04L 43/026 |
| 2018/0309764 A1* | 10/2018 | Kras | G09B 19/0053 |
| 2018/0314846 A1* | 11/2018 | Schultz | G06F 9/45558 |
| 2018/0316725 A1* | 11/2018 | Mani | H04L 67/125 |
| 2018/0341519 A1* | 11/2018 | Vyas | G06F 9/4856 |
| 2018/0343238 A1* | 11/2018 | Tola | H04L 63/0421 |
| 2018/0349629 A1* | 12/2018 | Chenchev | G06F 21/568 |
| 2018/0359369 A1 | 12/2018 | Golshenas et al. | |
| 2018/0367308 A1 | 12/2018 | Kacin et al. | |
| 2018/0367396 A1* | 12/2018 | Kompella | H04L 41/122 |
| 2019/0020665 A1* | 1/2019 | Surcouf | H04L 9/3236 |
| 2019/0039569 A1 | 2/2019 | Reed et al. | |
| 2019/0052554 A1* | 2/2019 | Mukerji | H04L 63/1408 |
| 2019/0058709 A1* | 2/2019 | Kempf | G06F 21/64 |
| 2019/0065278 A1* | 2/2019 | Jeuk | G06F 9/5077 |
| 2019/0068449 A1* | 2/2019 | Sikand | H04L 41/0886 |
| 2019/0073373 A1 | 3/2019 | Surale et al. | |
| 2019/0075095 A1 | 3/2019 | Venable et al. | |
| 2019/0081955 A1* | 3/2019 | Chugtu | H04L 63/0236 |
| 2019/0095655 A1* | 3/2019 | Krawczewicz | H04L 9/3249 |
| 2019/0104411 A1 | 4/2019 | Hotchkiss et al. | |
| 2019/0109713 A1* | 4/2019 | Clark | G06F 16/182 |
| 2019/0116132 A1 | 4/2019 | Suzuki | |
| 2019/0124507 A1 | 4/2019 | Dotchkoff et al. | |
| 2019/0147154 A1 | 5/2019 | Das | |
| 2019/0149417 A1* | 5/2019 | Augusto Lopes | H04L 41/0886 |
| | | | 370/254 |
| 2019/0149429 A1* | 5/2019 | Stöcker | H04L 41/40 |
| | | | 709/225 |
| 2019/0156023 A1* | 5/2019 | Gerebe | G06F 21/51 |
| 2019/0158503 A1* | 5/2019 | Bansal | H04L 63/0272 |
| 2019/0163406 A1* | 5/2019 | Kazi | G06F 3/0667 |
| 2019/0174449 A1* | 6/2019 | Shan | H04W 60/04 |
| 2019/0213319 A1* | 7/2019 | Gerebe | H04L 63/12 |
| 2019/0215694 A1* | 7/2019 | Rubin | H04W 4/90 |
| 2019/0235605 A1* | 8/2019 | Chenchev | G06F 1/3234 |
| 2019/0253274 A1* | 8/2019 | Van Dussen | H04L 12/4641 |
| 2019/0254094 A1* | 8/2019 | Babu | H04W 76/11 |
| 2019/0258813 A1* | 8/2019 | Lewis | H04L 9/088 |
| 2019/0260753 A1* | 8/2019 | Lewis | H04L 63/102 |
| 2019/0261203 A1* | 8/2019 | Raleigh | H04W 28/0268 |
| 2019/0268167 A1* | 8/2019 | White | G06F 21/6218 |
| 2019/0281073 A1* | 9/2019 | Weith | H04W 12/06 |
| 2019/0281127 A1* | 9/2019 | Schmidt | H04L 67/51 |
| 2019/0289459 A1* | 9/2019 | Shan | H04W 76/25 |
| 2019/0297161 A1* | 9/2019 | Ayyadevara | H04L 67/56 |
| 2019/0303345 A1* | 10/2019 | Zhu | H04L 67/141 |
| 2019/0306754 A1* | 10/2019 | Shan | H04W 8/06 |
| 2019/0313359 A1* | 10/2019 | Lee | H04W 76/14 |
| 2019/0317821 A1* | 10/2019 | O'Neal | G06F 9/5072 |
| 2019/0318240 A1* | 10/2019 | Kulkarni | G06N 3/08 |
| 2019/0319950 A1* | 10/2019 | Bowling | H04L 63/029 |
| 2019/0327320 A1* | 10/2019 | Rubin | H04L 12/1859 |
| 2019/0332777 A1* | 10/2019 | Edwards | H04L 9/14 |
| 2019/0340341 A1* | 11/2019 | Fleck | H04L 63/20 |
| 2019/0349742 A1* | 11/2019 | Kim | H04W 48/16 |
| 2019/0349758 A1 | 11/2019 | Zhu et al. | |
| 2019/0386969 A1* | 12/2019 | Verzun | G06F 21/606 |
| 2020/0004451 A1* | 1/2020 | Prohofsky | G06F 3/0604 |
| 2020/0007540 A1 | 1/2020 | Kawaguchi et al. | |
| 2020/0021615 A1* | 1/2020 | Wainner | G06F 8/71 |
| 2020/0026850 A1* | 1/2020 | Levin | G06F 9/45558 |
| 2020/0034248 A1* | 1/2020 | Nara | G06F 11/1448 |
| 2020/0067801 A1* | 2/2020 | McCormick | H04L 43/062 |

(56) References Cited

U.S. PATENT DOCUMENTS

| | | | |
|---|---|---|---|
| 2020/0077265 A1* | 3/2020 | Singh | H04L 63/0272 |
| 2020/0089516 A1* | 3/2020 | Vijayvargiya | H04L 41/0813 |
| 2020/0097195 A1* | 3/2020 | Fritz | G06F 3/0647 |
| 2020/0112850 A1* | 4/2020 | Lee | H04W 4/40 |
| 2020/0153911 A1* | 5/2020 | Chauhan | H04L 65/403 |
| 2020/0177333 A1* | 6/2020 | Liu | H04W 76/25 |
| 2020/0193016 A1* | 6/2020 | Zeng | G06F 11/301 |
| 2020/0204551 A1* | 6/2020 | Singh | H04L 63/0218 |
| 2020/0205209 A1* | 6/2020 | Pan | H04W 4/40 |
| 2020/0214054 A1* | 7/2020 | Qiao | H04L 47/824 |
| 2020/0218798 A1* | 7/2020 | Kosaka | G06F 9/451 |
| 2020/0219023 A1 | 7/2020 | Duchastel | |
| 2020/0220848 A1 | 7/2020 | Patwardhan | |
| 2020/0220875 A1* | 7/2020 | Harguindeguy | H04L 63/101 |
| 2020/0228936 A1* | 7/2020 | Talebi Fard | H04W 8/186 |
| 2020/0229069 A1* | 7/2020 | Chun | H04W 76/30 |
| 2020/0257179 A1 | 8/2020 | Barnum et al. | |
| 2020/0257810 A1* | 8/2020 | Vrabec | G06F 21/53 |
| 2020/0259831 A1* | 8/2020 | Pampati | H04L 63/0281 |
| 2020/0260401 A1* | 8/2020 | So | H04W 76/50 |
| 2020/0267552 A1 | 8/2020 | Lee et al. | |
| 2020/0267554 A1* | 8/2020 | Faccin | H04L 63/101 |
| 2020/0267785 A1* | 8/2020 | Talebi Fard | H04L 45/04 |
| 2020/0272911 A1 | 8/2020 | Quiros Araya et al. | |
| 2020/0280592 A1* | 9/2020 | Ithal | H04L 63/12 |
| 2020/0296619 A1* | 9/2020 | Pan | H04W 76/14 |
| 2020/0296779 A1 | 9/2020 | Moghe et al. | |
| 2020/0304474 A1* | 9/2020 | Kisko | H04L 63/0823 |
| 2020/0314613 A1* | 10/2020 | Lee | H04W 4/44 |
| 2020/0314701 A1* | 10/2020 | Talebi Fard | H04W 36/0016 |
| 2020/0320189 A1* | 10/2020 | Zhang | G06F 21/54 |
| 2020/0322262 A1* | 10/2020 | Maino | H04L 67/10 |
| 2020/0322286 A1 | 10/2020 | Mehta et al. | |
| 2020/0323030 A1 | 10/2020 | Mehta et al. | |
| 2020/0334084 A1* | 10/2020 | Jacobson | G06F 11/3037 |
| 2020/0336484 A1* | 10/2020 | Mahajan | H04L 63/0884 |
| 2020/0344637 A1* | 10/2020 | Kim | H04W 4/06 |
| 2020/0351699 A1* | 11/2020 | Pan | H04W 28/0268 |
| 2020/0351980 A1* | 11/2020 | Talebi Fard | H04W 76/40 |
| 2020/0351984 A1* | 11/2020 | Talebi Fard | H04W 76/40 |
| 2020/0367141 A1* | 11/2020 | Cakulev | H04L 12/1407 |
| 2020/0382488 A1 | 12/2020 | Liu et al. | |
| 2020/0389426 A1* | 12/2020 | Enguehard | H04L 61/35 |
| 2020/0396678 A1* | 12/2020 | Lee | H04W 48/18 |
| 2020/0401452 A1* | 12/2020 | Piercey | G06F 9/5016 |
| 2020/0404107 A1* | 12/2020 | Cheng | H04W 76/12 |
| 2021/0011984 A1* | 1/2021 | Renke | G06F 21/554 |
| 2021/0021431 A1* | 1/2021 | Guim Bernat | H04L 9/3239 |
| 2021/0026819 A1* | 1/2021 | Beard | H04L 41/0894 |
| 2021/0029029 A1* | 1/2021 | Mehmedagic | H04L 43/0876 |
| 2021/0029119 A1* | 1/2021 | Raman | H04W 12/37 |
| 2021/0029132 A1* | 1/2021 | Wilczynski | G06F 21/6227 |
| 2021/0029168 A1* | 1/2021 | Jeong | H04L 63/0263 |
| 2021/0037380 A1* | 2/2021 | Lee | H04W 12/69 |
| 2021/0056524 A1 | 2/2021 | Isgar | |
| 2021/0056536 A1 | 2/2021 | Carter et al. | |
| 2021/0075631 A1* | 3/2021 | Liao | H04M 15/8038 |
| 2021/0076444 A1* | 3/2021 | Shu | H04W 8/08 |
| 2021/0091941 A1 | 3/2021 | Pancras et al. | |
| 2021/0099490 A1* | 4/2021 | Crabtree | H04L 63/20 |
| 2021/0105275 A1* | 4/2021 | Bansal | H04L 63/0281 |
| 2021/0105596 A1* | 4/2021 | Prabhakar | H04W 4/50 |
| 2021/0109900 A1* | 4/2021 | McIlroy | G06F 16/1752 |
| 2021/0117241 A1* | 4/2021 | Xia | G06F 9/45558 |
| 2021/0120408 A1* | 4/2021 | Pazhyannur | H04L 63/101 |
| 2021/0120473 A1* | 4/2021 | Yao | H04W 36/0079 |
| 2021/0120596 A1* | 4/2021 | Youn | H04W 76/12 |
| 2021/0122261 A1* | 4/2021 | Qiao | H04W 4/40 |
| 2021/0133313 A1* | 5/2021 | Sakib | G06F 21/53 |
| 2021/0136041 A1* | 5/2021 | Foxhoven | H04L 63/0876 |
| 2021/0141655 A1* | 5/2021 | Gamage | G06F 9/45545 |
| 2021/0157655 A1* | 5/2021 | Foreman | G06F 9/5077 |
| 2021/0168125 A1* | 6/2021 | Vemulpali | H04L 9/3236 |
| 2021/0168142 A1* | 6/2021 | Foxhoven | H04L 67/51 |
| 2021/0168613 A1* | 6/2021 | Suh | H04W 12/009 |
| 2021/0168661 A1 | 6/2021 | Wong et al. | |
| 2021/0168751 A1* | 6/2021 | Stojanovski | H04W 60/00 |
| 2021/0194760 A1* | 6/2021 | Barton | H04L 41/0803 |
| 2021/0211408 A1* | 7/2021 | Porras | G06F 11/3409 |
| 2021/0211423 A1 | 7/2021 | Tan et al. | |
| 2021/0211870 A1* | 7/2021 | Perras | H04W 4/70 |
| 2021/0218594 A1* | 7/2021 | Sundararajan | H04L 47/76 |
| 2021/0218652 A1* | 7/2021 | Raut | H04L 45/64 |
| 2021/0218801 A1* | 7/2021 | Zhang | H04L 41/0806 |
| 2021/0223128 A1 | 7/2021 | Kirch | |
| 2021/0224091 A1 | 7/2021 | Hayatnagarkar et al. | |
| 2021/0226850 A1* | 7/2021 | Xu | H04W 4/50 |
| 2021/0226910 A1 | 7/2021 | Ranpise et al. | |
| 2021/0226987 A1* | 7/2021 | Summers | H04L 63/1441 |
| 2021/0227438 A1* | 7/2021 | Xu | H04W 24/02 |
| 2021/0234860 A1* | 7/2021 | Bansal | H04W 12/37 |
| 2021/0234898 A1* | 7/2021 | Desai | H04L 63/104 |
| 2021/0243678 A1* | 8/2021 | Drevon | H04W 48/02 |
| 2021/0250333 A1* | 8/2021 | Negrea | H04L 67/10 |
| 2021/0250890 A1* | 8/2021 | Won | H04W 76/50 |
| 2021/0258859 A1* | 8/2021 | Watfa | H04W 76/27 |
| 2021/0274340 A1* | 9/2021 | Sun | H04W 48/20 |
| 2021/0281572 A1 | 9/2021 | Fernandez-Spadaro et al. | |
| 2021/0286899 A1* | 9/2021 | Schroeder | H04L 63/102 |
| 2021/0294970 A1 | 9/2021 | Bender et al. | |
| 2021/0306310 A1 | 9/2021 | Tan | |
| 2021/0307101 A1* | 9/2021 | Kim | H04W 48/02 |
| 2021/0312400 A1 | 10/2021 | Irimie et al. | |
| 2021/0314301 A1* | 10/2021 | Chanak | H04L 63/0823 |
| 2021/0314338 A1* | 10/2021 | Howe | H04L 63/1408 |
| 2021/0314399 A1 | 10/2021 | Hyun et al. | |
| 2021/0320897 A1* | 10/2021 | Stojanovski | H04W 4/50 |
| 2021/0336932 A1* | 10/2021 | Chanak | H04L 9/006 |
| 2021/0336933 A1* | 10/2021 | Shah | H04L 9/14 |
| 2021/0336934 A1* | 10/2021 | Deshmukh | H04L 63/105 |
| 2021/0336959 A1* | 10/2021 | Shah | H04L 63/0281 |
| 2021/0344492 A1 | 11/2021 | Goodsitt et al. | |
| 2021/0344722 A1* | 11/2021 | Goyal | H04L 63/0272 |
| 2021/0360294 A1* | 11/2021 | Liao | H04L 41/5019 |
| 2021/0360371 A1* | 11/2021 | Qiao | H04W 48/16 |
| 2021/0367920 A1* | 11/2021 | Devarajan | H04L 63/166 |
| 2021/0367944 A1* | 11/2021 | Gupta | H04L 67/56 |
| 2021/0368339 A1* | 11/2021 | Watfa | H04W 12/06 |
| 2021/0368581 A1* | 11/2021 | Shan | H04W 8/24 |
| 2021/0377210 A1* | 12/2021 | Singh | H04L 67/125 |
| 2021/0377222 A1* | 12/2021 | Sharma | H04L 63/0823 |
| 2021/0377223 A1* | 12/2021 | Chanak | G06F 9/547 |
| 2021/0377303 A1* | 12/2021 | Bui | G06F 40/14 |
| 2021/0382739 A1* | 12/2021 | Guo | G06F 21/53 |
| 2021/0385642 A1* | 12/2021 | Di Girolamo | H04W 8/18 |
| 2021/0385742 A1* | 12/2021 | Liao | H04W 48/02 |
| 2021/0397313 A1* | 12/2021 | Desai | G06F 3/0484 |
| 2021/0397463 A1* | 12/2021 | Schimon | G06F 3/0482 |
| 2021/0399954 A1* | 12/2021 | Dabell | G06F 9/5077 |
| 2021/0400060 A1* | 12/2021 | Chacko | H04L 63/1416 |
| 2021/0406127 A1* | 12/2021 | Knierim | G06F 9/5072 |
| 2021/0406902 A1 | 12/2021 | Bernert et al. | |
| 2021/0409441 A1* | 12/2021 | Singh | H04L 63/1433 |
| 2021/0409449 A1* | 12/2021 | Crabtree | G06F 16/2477 |
| 2021/0410059 A1* | 12/2021 | Talebi Fard | H04L 69/24 |
| 2022/0007161 A1* | 1/2022 | Shan | H04W 4/40 |
| 2022/0007180 A1* | 1/2022 | Liao | H04L 67/14 |
| 2022/0007437 A1 | 1/2022 | Goenka et al. | |
| 2022/0014466 A1* | 1/2022 | Doshi | H04L 63/0471 |
| 2022/0014512 A1* | 1/2022 | Raleigh | H04L 63/20 |
| 2022/0029965 A1* | 1/2022 | Chanak | H04L 67/10 |
| 2022/0030495 A1* | 1/2022 | Qiao | H04W 60/04 |
| 2022/0038544 A1 | 2/2022 | Grinstein et al. | |
| 2022/0038986 A1* | 2/2022 | Soliman | H04W 40/02 |
| 2022/0039004 A1* | 2/2022 | Soliman | H04W 88/18 |
| 2022/0043665 A1* | 2/2022 | Vidyadhara | G06F 9/45558 |
| 2022/0046059 A1* | 2/2022 | Pandurangi | H04L 63/20 |
| 2022/0052850 A1 | 2/2022 | Fagan et al. | |
| 2022/0052961 A1* | 2/2022 | Chauhan | H04L 47/82 |
| 2022/0053449 A1* | 2/2022 | Shan | H04W 36/0066 |
| 2022/0060398 A1* | 2/2022 | Shishir | H04L 43/08 |
| 2022/0060507 A1* | 2/2022 | Crabtree | H04L 63/1433 |
| 2022/0060509 A1* | 2/2022 | Crabtree | H04L 63/1441 |
| 2022/0060557 A1* | 2/2022 | Bathla | H04L 63/20 |

(56) References Cited

U.S. PATENT DOCUMENTS

| | | | | |
|---|---|---|---|---|
| 2022/0070183 | A1* | 3/2022 | Goyal | H04L 63/0236 |
| 2022/0070967 | A1* | 3/2022 | Li | H04W 60/00 |
| 2022/0086639 | A1 | 3/2022 | Lu et al. | |
| 2022/0092024 | A1* | 3/2022 | Kavaipatti Anantharamakrishnan | G06F 16/119 |
| 2022/0094706 | A1* | 3/2022 | Higgins | H04L 63/0209 |
| 2022/0095260 | A1* | 3/2022 | Shan | H04W 12/06 |
| 2022/0103525 | A1* | 3/2022 | Shribman | G06F 16/955 |
| 2022/0103987 | A1* | 3/2022 | Shan | H04W 4/40 |
| 2022/0104164 | A1* | 3/2022 | Kedalagudde | H04W 8/12 |
| 2022/0104296 | A1* | 3/2022 | Mary | H04W 76/15 |
| 2022/0109696 | A1* | 4/2022 | Deshmukh | H04L 43/06 |
| 2022/0110023 | A1* | 4/2022 | Wu | H04W 28/16 |
| 2022/0116397 | A1* | 4/2022 | Deshmukh | H04L 63/102 |
| 2022/0116814 | A1* | 4/2022 | Di Girolamo | H04W 4/027 |
| 2022/0117036 | A1* | 4/2022 | Moustafa | H04W 24/04 |
| 2022/0124521 | A1* | 4/2022 | Xu | H04W 48/16 |
| 2022/0124595 | A1* | 4/2022 | Xu | H04W 40/248 |
| 2022/0129583 | A1* | 4/2022 | Balasubramanian | G06F 21/6254 |
| 2022/0141662 | A1* | 5/2022 | Liao | H04W 12/37 726/1 |
| 2022/0150312 | A1 | 5/2022 | Ranpise et al. | |
| 2022/0159029 | A1 | 5/2022 | Bendersky et al. | |
| 2022/0159527 | A1* | 5/2022 | Lee | H04W 8/24 |
| 2022/0159605 | A1* | 5/2022 | Li | H04W 76/10 |
| 2022/0164186 | A1* | 5/2022 | Pamidala | G06F 18/2155 |
| 2022/0167299 | A1* | 5/2022 | Xu | H04L 41/0894 |
| 2022/0174580 | A1* | 6/2022 | You | H04W 12/102 |
| 2022/0182412 | A1* | 6/2022 | Borak | H04L 63/1491 |
| 2022/0191052 | A1* | 6/2022 | Garcia Azorero | H04M 15/66 |
| 2022/0191100 | A1* | 6/2022 | Kim | H04L 61/4511 |
| 2022/0191736 | A1* | 6/2022 | Barton | H04L 41/0896 |
| 2022/0191765 | A1* | 6/2022 | Ding | H04W 40/248 |
| 2022/0200924 | A1* | 6/2022 | Lu | H04B 7/0452 |
| 2022/0200972 | A1* | 6/2022 | Potlapally | H04L 63/0464 |
| 2022/0200993 | A1* | 6/2022 | Smith | H04L 63/20 |
| 2022/0201041 | A1* | 6/2022 | Keiser, Jr. | H04L 63/20 |
| 2022/0201638 | A1* | 6/2022 | Arrobo Vidal | H04W 48/08 |
| 2022/0210698 | A1* | 6/2022 | Ly | H04W 40/22 |
| 2022/0217084 | A1 | 7/2022 | Arora et al. | |
| 2022/0224703 | A1* | 7/2022 | Devarajan | H04L 63/0428 |
| 2022/0225448 | A1* | 7/2022 | Li | H04W 60/04 |
| 2022/0232020 | A1* | 7/2022 | Kandachar Sridhara Rao | H04L 63/1466 |
| 2022/0232363 | A1* | 7/2022 | Watfa | H04W 60/04 |
| 2022/0239698 | A1* | 7/2022 | Anantharaju | H04L 63/105 |
| 2022/0247771 | A1* | 8/2022 | Higgins | H04L 43/065 |
| 2022/0255966 | A1* | 8/2022 | Sienicki | H04L 63/123 |
| 2022/0263835 | A1* | 8/2022 | Pieczul | H04L 67/10 |
| 2022/0263913 | A1 | 8/2022 | Zhang et al. | |
| 2022/0264370 | A1* | 8/2022 | Qiao | H04W 60/06 |
| 2022/0264403 | A1* | 8/2022 | Watfa | H04W 36/06 |
| 2022/0264444 | A1* | 8/2022 | Ryu | H04W 76/18 |
| 2022/0264503 | A1* | 8/2022 | Starsinic | H04W 8/20 |
| 2022/0266451 | A1* | 8/2022 | Cristache | G05D 1/0297 |
| 2022/0272614 | A1* | 8/2022 | Lu | H04W 12/06 |
| 2022/0272620 | A1* | 8/2022 | Ninglekhu | H04W 48/06 |
| 2022/0278900 | A1* | 9/2022 | Pieczul | H04L 41/22 |
| 2022/0279075 | A1* | 9/2022 | Fan | H04M 15/8033 |
| 2022/0286428 | A1* | 9/2022 | Howe | H04L 63/0227 |
| 2022/0286429 | A1* | 9/2022 | Howe | H04L 63/0227 |
| 2022/0286480 | A1* | 9/2022 | Jadhav | H04L 63/20 |
| 2022/0286911 | A1* | 9/2022 | Howe | H04L 63/1425 |
| 2022/0294540 | A1 | 9/2022 | Black et al. | |
| 2022/0295440 | A1* | 9/2022 | Kumar | H04W 4/70 |
| 2022/0309152 | A1* | 9/2022 | Araujo | G06F 21/53 |
| 2022/0311767 | A1 | 9/2022 | Ouellet | |
| 2022/0312176 | A1* | 9/2022 | Matolia | H04W 48/16 |
| 2022/0312299 | A1* | 9/2022 | Mochizuki | H04W 48/10 |
| 2022/0312517 | A1* | 9/2022 | Xu | H04W 72/04 |
| 2022/0329442 | A1* | 10/2022 | Bulusu | H04L 63/1416 |
| 2022/0329477 | A1 | 10/2022 | Chiganmi et al. | |
| 2022/0329495 | A1* | 10/2022 | Xie | H04L 41/40 |
| 2022/0329585 | A1* | 10/2022 | Chhabra | H04L 12/4633 |
| 2022/0330138 | A1* | 10/2022 | Shan | H04W 48/16 |
| 2022/0330193 | A1* | 10/2022 | Shan | H04W 8/005 |
| 2022/0334864 | A1 | 10/2022 | Kn et al. | |
| 2022/0338000 | A1* | 10/2022 | Lee | H04W 8/20 |
| 2022/0345875 | A1* | 10/2022 | Kumar | H04W 8/205 |
| 2022/0353244 | A1* | 11/2022 | Kahn | H04L 67/12 |
| 2022/0353799 | A1* | 11/2022 | Talebi Fard | H04W 48/16 |
| 2022/0360670 | A1* | 11/2022 | Singh | H04M 15/765 |
| 2022/0361136 | A1* | 11/2022 | Watfa | H04W 48/04 |
| 2022/0368726 | A1* | 11/2022 | Balasubramaniam | H04L 63/1441 |
| 2022/0369408 | A1* | 11/2022 | Shariat | H04W 4/023 |
| 2022/0377529 | A1* | 11/2022 | Kim | H04W 8/08 |
| 2022/0377617 | A1* | 11/2022 | Deng | H04W 76/14 |
| 2022/0377654 | A1* | 11/2022 | Soliman | H04W 28/0875 |
| 2022/0386100 | A1* | 12/2022 | Lee | H04W 28/02 |
| 2022/0391867 | A1* | 12/2022 | Glaser | G06F 3/017 |
| 2022/0393943 | A1* | 12/2022 | Pangeni | H04L 67/10 |
| 2022/0394566 | A1* | 12/2022 | Liu | H04W 8/26 |
| 2022/0400378 | A1* | 12/2022 | Wang | H04W 12/06 |
| 2022/0408396 | A1* | 12/2022 | Youn | H04W 60/06 |
| 2022/0413883 | A1* | 12/2022 | Clebsch | H04L 63/123 |
| 2022/0417252 | A1* | 12/2022 | Moon | H04L 63/0846 |
| 2022/0417254 | A1* | 12/2022 | Moon | H04L 63/104 |
| 2022/0417286 | A1* | 12/2022 | Moon | H04L 63/02 |
| 2023/0007439 | A1 | 1/2023 | Williams et al. | |
| 2023/0007464 | A1* | 1/2023 | Lee | H04L 41/5051 |
| 2023/0007611 | A1* | 1/2023 | Karampatsis | H04L 41/0893 |
| 2023/0011468 | A1* | 1/2023 | Giri | G06F 21/604 |
| 2023/0015603 | A1* | 1/2023 | Smith | H04L 63/1433 |
| 2023/0018809 | A1* | 1/2023 | Deshmukh | H04L 63/20 |
| 2023/0019448 | A1* | 1/2023 | Deshmukh | H04L 63/1433 |
| 2023/0022134 | A1* | 1/2023 | Talwar | G06F 9/45558 |
| 2023/0023571 | A1* | 1/2023 | Xing | H04M 15/93 |
| 2023/0024999 | A1* | 1/2023 | Wu | H04W 12/0433 |
| 2023/0027290 | A1* | 1/2023 | Chen | H04W 52/367 |
| 2023/0027507 | A1 | 1/2023 | He et al. | |
| 2023/0029714 | A1* | 2/2023 | Xu | H04L 12/1407 |
| 2023/0032790 | A1 | 2/2023 | Mahajan et al. | |
| 2023/0040365 | A1* | 2/2023 | Raleigh | H04W 48/16 |
| 2023/0040747 | A1* | 2/2023 | Watfa | H04W 8/183 |
| 2023/0042646 | A1* | 2/2023 | Mahadevan | G06F 9/5077 |
| 2023/0044346 | A1* | 2/2023 | Nuggehalli | H04W 4/24 |
| 2023/0052699 | A1* | 2/2023 | Ninglekhu | H04W 60/04 |
| 2023/0052827 | A1* | 2/2023 | Araujo | G06F 9/4881 |
| 2023/0056442 | A1* | 2/2023 | Ly | H04W 24/08 |
| 2023/0058336 | A1* | 2/2023 | Kim | H04L 45/0377 |
| 2023/0059173 | A1* | 2/2023 | Moon | H04L 63/0876 |
| 2023/0059726 | A1* | 2/2023 | Osipov | G06F 21/16 |
| 2023/0067223 | A1 | 3/2023 | Freed et al. | |
| 2023/0073757 | A1* | 3/2023 | Chandramouli | H04W 68/005 |
| 2023/0078317 | A1* | 3/2023 | Xing | H04B 7/15 370/315 |
| 2023/0083175 | A1* | 3/2023 | Xiong | H04W 4/06 370/312 |
| 2023/0094062 | A1* | 3/2023 | Kim | H04W 8/12 455/456.1 |
| 2023/0098558 | A1* | 3/2023 | Savir | H04L 63/1441 726/10 |
| 2023/0109272 | A1* | 4/2023 | Ryu | H04L 63/0892 370/329 |
| 2023/0113180 | A1* | 4/2023 | Srinivasan | G06F 16/27 714/100 |
| 2023/0113519 | A1* | 4/2023 | Fernandez Alonso | H04W 76/25 370/329 |
| 2023/0115982 | A1* | 4/2023 | Lin | H04L 63/104 726/1 |
| 2023/0116463 | A1* | 4/2023 | Rath | H04L 63/102 726/22 |
| 2023/0118271 | A1* | 4/2023 | Punathil | G06N 5/02 717/120 |
| 2023/0129117 | A1* | 4/2023 | Ding | H04L 63/104 726/7 |
| 2023/0130746 | A1* | 4/2023 | Binder | G06F 9/5016 726/26 |

(56) References Cited

U.S. PATENT DOCUMENTS

| | | | | |
|---|---|---|---|---|
| 2023/0133444 A1* | 5/2023 | Dimitrovski | H04L 63/0236 | 370/331 |
| 2023/0135699 A1* | 5/2023 | Liao | H04W 4/50 | 370/252 |
| 2023/0136984 A1* | 5/2023 | Lee | H04W 40/24 | 370/392 |
| 2023/0138033 A1* | 5/2023 | Rajadurai | H04W 12/033 | 713/168 |
| 2023/0147538 A1* | 5/2023 | Lee | H04W 48/18 | 370/329 |
| 2023/0153447 A1 | 5/2023 | Kapadia | | |
| 2023/0156513 A1* | 5/2023 | Xing | H04W 72/25 | 370/329 |
| 2023/0156514 A1* | 5/2023 | Eriksson | H04W 24/08 | 370/235 |
| 2023/0163984 A1* | 5/2023 | Shan | H04M 15/66 | 370/259 |
| 2023/0164523 A1* | 5/2023 | Wu | H04W 60/04 | 455/435.1 |
| 2023/0171280 A1* | 6/2023 | Bansal | H04L 63/1433 | 726/25 |
| 2023/0171824 A1* | 6/2023 | Purkayastha | H04W 76/40 | 370/310 |
| 2023/0179632 A1* | 6/2023 | Duraisamy | H04L 9/3213 | 726/9 |
| 2023/0188525 A1 | 6/2023 | Singh et al. | | |
| 2023/0189192 A1* | 6/2023 | Talebi Fard | H04W 12/088 | 726/4 |
| 2023/0195884 A1* | 6/2023 | Belair | G06F 21/6218 | 726/1 |
| 2023/0198946 A1* | 6/2023 | Zacks | H04L 47/2483 | 726/11 |
| 2023/0199017 A1* | 6/2023 | Chacko | H04L 63/20 | 726/22 |
| 2023/0199632 A1* | 6/2023 | Talebi Fard | H04W 48/16 | 455/434 |
| 2023/0205505 A1* | 6/2023 | Chen | G06F 9/455 | 717/174 |
| 2023/0206329 A1* | 6/2023 | Cella | G06Q 20/0855 | |
| 2023/0208810 A1* | 6/2023 | Dhanasekar | H04L 63/1416 | 726/26 |
| 2023/0209329 A1* | 6/2023 | Guo | H04W 60/04 | 455/418 |
| 2023/0224304 A1* | 7/2023 | Lukanov | H04L 63/102 | 726/1 |
| 2023/0231884 A1* | 7/2023 | Deshmukh | H04L 63/1441 | 726/1 |
| 2023/0239270 A1* | 7/2023 | Nahas | H04L 63/1425 | 726/1 |
| 2023/0239325 A1* | 7/2023 | Keiser, Jr. | H04L 63/1416 | 726/1 |
| 2023/0247003 A1* | 8/2023 | Chanak | H04L 9/3226 | 726/1 |
| 2023/0247027 A1* | 8/2023 | Brar | H04L 63/0272 | 726/4 |
| 2023/0247087 A1* | 8/2023 | Nagaraja | H04L 67/10 | 709/201 |
| 2023/0254318 A1* | 8/2023 | Hu | G06F 21/604 | 726/1 |
| 2023/0262030 A1* | 8/2023 | Bansal | H04W 12/37 | 726/13 |
| 2023/0262818 A1* | 8/2023 | Kim | H04W 76/19 | 370/328 |
| 2023/0269137 A1* | 8/2023 | Fehring | H04L 67/1097 | 709/220 |
| 2023/0283639 A1* | 9/2023 | Melson | H04L 41/0816 | 726/1 |
| 2023/0284077 A1* | 9/2023 | Pateromichelakis | H04L 47/28 | 370/235 |
| 2023/0291735 A1* | 9/2023 | Cheethirala | H04L 63/0876 | |
| 2023/0300651 A1* | 9/2023 | Kim | H04L 41/5067 | 370/252 |
| 2023/0300702 A1* | 9/2023 | You | H04W 8/065 | 370/331 |
| 2023/0309158 A1* | 9/2023 | Qiao | H04W 72/1268 | |
| 2023/0319047 A1* | 10/2023 | Wu | H04L 67/06 | 726/26 |
| 2023/0319112 A1* | 10/2023 | Kaimal | H04L 63/20 | 726/1 |
| 2023/0319679 A1* | 10/2023 | Sung | H04W 40/12 | 370/329 |
| 2023/0319685 A1* | 10/2023 | Talebi Fard | H04W 48/14 | 455/422.1 |
| 2023/0319915 A1* | 10/2023 | Paladugu | H04W 76/14 | 370/315 |
| 2023/0328821 A1* | 10/2023 | Talebi Fard | H04W 76/15 | 370/329 |
| 2023/0336471 A1* | 10/2023 | Dhody | H04L 43/062 | |
| 2023/0336977 A1* | 10/2023 | Henry | H04L 61/5069 | |
| 2023/0344917 A1* | 10/2023 | Chanak | H04L 67/02 | |
| 2023/0362198 A1* | 11/2023 | Jung | H04L 63/0263 | |
| 2023/0362623 A1* | 11/2023 | Lee | H04W 8/12 | |
| 2023/0362632 A1* | 11/2023 | Hu | H04W 12/033 | |
| 2023/0362640 A1* | 11/2023 | Edge | H04B 7/1851 | |
| 2023/0362704 A1* | 11/2023 | Edge | H04B 7/18513 | |
| 2023/0367833 A1* | 11/2023 | Kol | H04L 63/0876 | |
| 2023/0368193 A1* | 11/2023 | Russinovich | H04L 9/3234 | |
| 2023/0370992 A1* | 11/2023 | You | H04W 12/75 | |
| 2023/0371111 A1* | 11/2023 | Xu | H04L 65/1069 | |
| 2023/0388785 A1* | 11/2023 | Ferdi | H04W 12/041 | |
| 2023/0397086 A1* | 12/2023 | Kim | H04W 76/12 | |
| 2023/0403272 A1* | 12/2023 | Cheethirala | H04L 63/0823 | |
| 2023/0403305 A1* | 12/2023 | Dementyev | H04L 63/104 | |
| 2023/0412638 A1* | 12/2023 | Dogaru | H04L 63/0236 | |
| 2023/0421478 A1* | 12/2023 | Chhabra | H04L 63/0272 | |
| 2023/0422149 A1* | 12/2023 | Kim | H04W 48/06 | |
| 2024/0007983 A1* | 1/2024 | Liu | H04W 8/26 | |
| 2024/0008130 A1* | 1/2024 | Kim | H04W 76/20 | |
| 2024/0012674 A1* | 1/2024 | Xie | G06F 9/5077 | |
| 2024/0015567 A1* | 1/2024 | Mladin | H04W 28/0268 | |
| 2024/0022469 A1* | 1/2024 | Hu | H04L 41/122 | |
| 2024/0022593 A1* | 1/2024 | Costa | H04L 63/102 | |
| 2024/0048229 A1* | 2/2024 | Kumar | H04B 7/18513 | |
| 2024/0048966 A1* | 2/2024 | Suh | H04W 48/18 | |
| 2024/0049171 A1* | 2/2024 | Khirallah | H04B 7/18513 | |
| 2024/0056904 A1* | 2/2024 | Watfa | H04W 36/0011 | |
| 2024/0056947 A1* | 2/2024 | Watfa | H04W 60/00 | |
| 2024/0056957 A1* | 2/2024 | Wang | H04W 48/18 | |
| 2024/0073249 A1 | 2/2024 | Cirello Filho et al. | | |
| 2024/0073252 A1* | 2/2024 | Kathpal | H04L 63/205 | |
| 2024/0073772 A1* | 2/2024 | Gupta | H04W 76/12 | |
| 2024/0080340 A1* | 3/2024 | Ben Henda | H04L 63/162 | |
| 2024/0080342 A1* | 3/2024 | Mishra Gupta | H04L 63/20 | |
| 2024/0080730 A1* | 3/2024 | Zhang | H04W 36/033 | |
| 2024/0080791 A1* | 3/2024 | Aghili | H04W 60/005 | |
| 2024/0086558 A1* | 3/2024 | Jadhav | G06F 21/6218 | |
| 2024/0089291 A1* | 3/2024 | Shpilyuck | H04L 63/20 | |
| 2024/0098089 A1* | 3/2024 | Adogla | G06Q 50/50 | |
| 2024/0104553 A1* | 3/2024 | Thorpe | G06Q 20/3674 | |
| 2024/0106821 A1 | 3/2024 | Crawford et al. | | |
| 2024/0106855 A1* | 3/2024 | Sundararajan | H04L 63/1425 | |
| 2024/0107481 A1* | 3/2024 | Tiwari | H04W 76/15 | |
| 2024/0111821 A1* | 4/2024 | Dogaru | H04L 63/0281 | |
| 2024/0114057 A1* | 4/2024 | Bjerrum | H04L 63/126 | |
| 2024/0129321 A1* | 4/2024 | Howe | H04L 63/20 | |
| 2024/0129338 A1* | 4/2024 | Azad | H04L 63/1425 | |
| 2024/0146689 A1* | 5/2024 | Bansal | H04L 63/0227 | |
| 2024/0147207 A1* | 5/2024 | Watfa | H04W 12/03 | |
| 2024/0152602 A1* | 5/2024 | Belair | G06F 21/54 | |
| 2024/0154970 A1* | 5/2024 | Cheethirala | H04L 63/101 | |
| 2024/0163308 A1* | 5/2024 | Kahn | H04L 63/1458 | |
| 2024/0163312 A1* | 5/2024 | Azad | H04L 63/20 | |
| 2024/0168793 A1* | 5/2024 | Pyka | G06F 21/552 | |
| 2024/0169062 A1* | 5/2024 | Lee | G06F 21/554 | |
| 2024/0171969 A1* | 5/2024 | Kumar | H04W 8/245 | |
| 2024/0179066 A1* | 5/2024 | Shen | H04L 41/122 | |
| 2024/0179070 A1* | 5/2024 | Zhou | H04L 41/0895 | |
| 2024/0179071 A1* | 5/2024 | Zhou | H04L 41/0893 | |
| 2024/0179168 A1* | 5/2024 | Manthiramoorthy | H04L 63/0876 | |

(56) References Cited

U.S. PATENT DOCUMENTS

| | | | |
|---|---|---|---|
| 2024/0179509 A1* | 5/2024 | Fu | H04W 8/26 |
| 2024/0187968 A1* | 6/2024 | Tiwari | H04W 8/20 |
| 2024/0187990 A1* | 6/2024 | Chen | H04W 76/28 |
| 2024/0205191 A1* | 6/2024 | Vijayvargiya | H04L 63/0263 |
| 2024/0205863 A1* | 6/2024 | Nassar | H04W 60/005 |
| 2024/0236047 A1 | 7/2024 | Filho et al. | |
| 2024/0241978 A1* | 7/2024 | Chopra | G06F 21/6218 |
| 2024/0244014 A1* | 7/2024 | De Foy | H04L 45/74 |
| 2024/0273211 A1* | 8/2024 | Singh | G06F 21/577 |
| 2024/0275680 A1* | 8/2024 | Palnati | H04L 41/40 |
| 2024/0275803 A1* | 8/2024 | Varanasi | H04L 63/1425 |
| 2024/0283826 A1* | 8/2024 | Ganguli | H04L 63/0281 |
| 2024/0291846 A1* | 8/2024 | Saraf | H04L 63/0876 |
| 2024/0297881 A1* | 9/2024 | Bansal | H04L 63/10 |
| 2024/0303336 A1* | 9/2024 | Tammireddy | H04L 63/1408 |
| 2024/0314140 A1* | 9/2024 | Beevor | H04L 63/107 |
| 2024/0314176 A1* | 9/2024 | Varanasi | H04L 63/30 |
| 2024/0323189 A1* | 9/2024 | Mihajlovic | H04L 63/20 |
| 2024/0334190 A1* | 10/2024 | Cheethirala | H04W 28/0835 |
| 2024/0356918 A1* | 10/2024 | Darbarwar | H04L 63/0876 |
| 2024/0364704 A1* | 10/2024 | Darbarwar | H04L 63/108 |
| 2024/0388606 A1* | 11/2024 | Mihajlovic | H04L 47/125 |
| 2024/0422198 A1* | 12/2024 | Pampati | H04L 63/10 |
| 2025/0112930 A1* | 4/2025 | Kozin | H04W 12/64 |

OTHER PUBLICATIONS

Jennings et al REsource LOcation and Discoveryu (RELOAD) Base Protocol, Internet Engineering Task Force (IETF), Request for Comments:RFC 6940, pp. 1-176 (Year: 2014).*

Soltani et al "A New Approach to Client Onboarding using Self-Soverign Identity and Distributed Ledger," IEEE, pp. 1129-1136 (Year: 2018).*

Seleznyov et al "An Access Control Model Based on Distributed Knowledge Management," IEEE Computer Society, pp. 1-4 (Year: 2004).*

Northern et al "Builiding Secure Environments for Microservices," IEEE, pp. 27-31 (Year: 2022).*

Al Qassem et al "Optimal Resource Allocation for Containerized Cloud Microservices," IEEE, pp. 271-274 (Year: 2022).*

Office Communication for U.S. Appl. No. 17/900,121 mailed Apr. 4, 2023, 13 Pages.

Office Communication for U.S. Appl. No. 18/091,006 mailed Apr. 19, 2023, 9 Pages.

Office Communication for U.S. Appl. No. 17/954,697 mailed May 12, 2023, 5 Pages.

Office Communication for U.S. Appl. No. 18/131,151 mailed Jun. 8, 2023, 9 Pages.

Office Communication for U.S. Appl. No. 17/954,697 mailed Jan. 20, 2023, 13 Pages.

Office Communication for U.S. Appl. No. 18/094,858 mailed Mar. 16, 2023, 10 Pages.

Office Communication for U.S. Appl. No. 18/091,006 mailed Mar. 31, 2023, 12 Pages.

Office Communication for U.S. Appl. No. 17/733,735 mailed Jul. 12, 2022, 38 Pages.

Office Communication for U.S. Appl. No. 17/733,735 mailed Nov. 1, 2022, 7 Pages.

Office Communication for U.S. Appl. No. 17/889,788 mailed Nov. 7, 2022, 12 Pages.

Office Communication for U.S. Appl. No. 18/091,895 mailed Apr. 5, 2023, 12 Pages.

Office Communication for U.S. Appl. No. 18/094,858 mailed Jul. 7, 2023, 12 Pages.

Office Communication for U.S. Appl. No. 18/131,151 mailed Jul. 10, 2023, 7 Pages.

Office Communication for U.S. Appl. No. 18/094,858 mailed Sep. 19, 2023, 4 Pages.

Office Communication for U.S. Appl. No. 18/091,895 mailed Jul. 11, 2023, 9 pages.

Office Communication for U.S. Appl. No. 18/236,360 mailed Oct. 25, 2023, 12 pages.

Office Communication for U.S. Appl. No. 18/236,360 mailed Nov. 13, 2023, 2 pages.

Office Communication for U.S. Appl. No. 18/238,649 mailed Nov. 1, 2023, 13 pages.

Office Communication for U.S. Appl. No. 18/094,858 mailed Oct. 25, 2023, 7 pages.

Office Communication for U.S. Appl. No. 18/238,649 mailed Jan. 26, 2024, 11 pages.

Office Communication for U.S. Appl. No. 18/238,649 mailed Feb. 26, 2024, 4 pages.

Office Communication for U.S. Appl. No. 18/238,649 mailed Mar. 14, 2024, 5 pages.

Office Communication for U.S. Appl. No. 18/587,821 mailed May 3, 2024, 12 pages.

Office Communication for U.S. Appl. No. 18/740,667 mailed Sep. 19, 2024, 8 pages.

* cited by examiner

IDENTITY AND ACTIVITY BASED NETWORK SECURITY POLICIES

CROSS-REFERENCE TO RELATED APPLICATION

This application is a Utility Patent application based on previously filed U.S. Provisional Patent Application U.S. Ser. No. 63/542,220 filed on Oct. 3, 2023, the benefit of the filing date of which is hereby claimed under 35 U.S.C. § 119 (e), and the contents of which is further incorporated in entirety by reference.

TECHNICAL FIELD

The present invention relates generally to network security, and more particularly, but not exclusively, to identity and activity based network security policies.

BACKGROUND

As organizations become increasingly dependent on networked environments, remote services, distributed services, or the like, managing and monitoring infrastructure access in networked environments can become both critically important and more difficult. Difficulties in managing network environments may not be new, however, interconnections among remote offices, data centers, remote employees, remote customers, and so on, have resulted in organizations relying more broadly on heterogeneous distributed networked services, or the like. Also, in some cases, regulatory environment has been adapting to the increase in computer-based services. Accordingly, organizations may be required to comply with regulatory regimes from multiple jurisdictions related to various critical subjects, such as, finance, privacy, employee rights, cross-jurisdiction taxation, and so on. The combination of the increase in reliance on distributed and networked services and ongoing changes in regulatory environments has tended to elevate the importance of managing and monitoring infrastructure access in networked environments both for operations as well as compliance with various regulatory regimes. Credential management is an important feature of infrastructure security. In some cases, it may be difficult to provide centralized management of technology infrastructure without enabling centralized access to the services providing infrastructure security management. Also, relying on configuring individual applications to enforce security policies may be cumbersome because different teams may be responsible for managing the different applications. Accordingly, deploying new or updated policies may be delayed because of the time that may be necessary for updating individual application instances, and so on. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
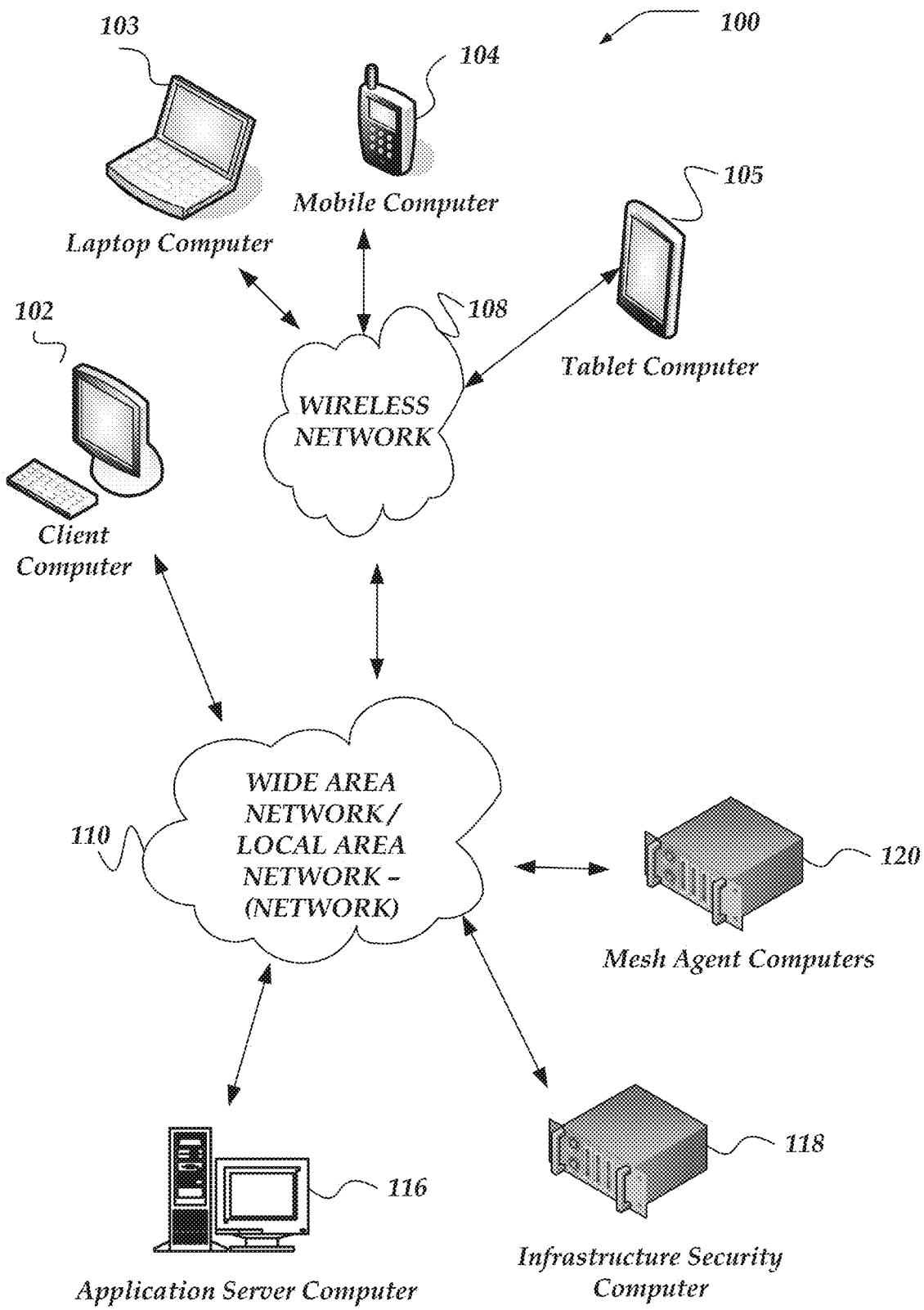
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, Python, R, Julia, JavaScript, Ruby, VBScript, Microsoft.NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "session" refers to a semi-permanent interactive packet interchange between two or more communicating endpoints in a networked environment. A session is set up or established at a certain point in time, and torn down at a later point in time. An established communication session may involve more than one message in each direction. A session may have stateful communication where at least one of the communicating endpoints saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to communication sessions with a semi-permanent connection for interactive packet interchange between two or more communicating endpoints, such as network devices. The connection may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

As used herein, the term "tuple" refers to a set of values that identify a source and destination of a network communication or network traffic packet, which may, under some circumstances, be a part of a network connection. In one embodiment, a tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. Tuples may be used to identify network flows (e.g., connection flows).

As used herein, the term, "protocol" refers generally to network protocols that may be employed in a network, including data-link layer protocols, transport layer protocols, application layer protocols, or the like. Thus, unless otherwise indicated, innovations described as working with or being associated with a protocol may be applicable to protocols of various OSI layers, or the like, or combination thereof.

As used herein, the term, "application protocol" refers generally to communication protocols that may be employed in a network that enable one or more applications or services and their client applications to communicate in a networked environment. Application protocols may be considered distinct from transport protocols that may be used to ferry application protocol traffic in networks or among processes/services.

As used herein, the term "mesh agent" refers to programs, process, or services that provide a node, link, or hop in a software defined network. Multiple mesh agents may provide secure tunnels between each other to provide a secure overlay network that may be provided in a conventional underlay network. In some cases, one or more mesh agents may be hosted on network computers in a networked environment.

As used herein, the term "ingress agent" refers to a mesh agent that a client application or user gains access to an overlay network. Ingress agents may be considered mesh agents that are on a logical edge of an overlay network. For example, if a client application requires access to an overlay network to access a protected resource, the first mesh agent that the client application communicates to join or access the overlay network may be considered an ingress agent.

As used herein, the term "egress agent" refers to a mesh agent that may directly communicate with a protected resource. Egress agents may be considered mesh agents that are on a logical edge of an overlay network. For example, client requests provided by a client to an ingress agent may be forwarded through one or more mesh agents in an overlay network until they reach an egress agent associated with the target resource.

As used herein, the term "credential information" refers to data or data structures that include credential secrets that enable access to protected resource servers. For example, credential information may include usernames, passwords, pass-phrases, security certificates, or the like.

As used herein, the term "policy container" refers to data or data structures that for managing policies for an overlay network. In some cases, policy containers may be associated with particular applications, application protocols, resources, or the like, referred to herein as activities that may be managed in an overlay network.

As used herein, the "activity" refers to one or more application protocols, applications, or the like. For brevity, policy containers may be described as being associated with activities. For example, a policy container may be associated with HTTP traffic while another policy container may be associated with a database application. Accordingly, in some embodiments, policies in a given policy container may be directed to enforcing policies on for a particular activity. Note, one of ordinary skill in the art will appreciate that the definition or declaration of an activity may vary depending on local requirements or local circumstances. Accordingly, in some embodiments, infrastructure security computers may provide user interfaces or configuration information that enable administrators of overlay networks to have broad authority to define or declare activities that may be relevant.

As used herein, the term "policy" refers to data or data structures that include particular instructions or declarations that may be evaluated to determine if a resource may be accessed by a client in an overlay network As used herein, the term "request" refers to data that may be directed from a client endpoint in an overlay network to a target resource in the overlay network. Requests may be considered to include data or messages that may initiate or establish transactions, sessions, actions, or the like, with target resources. In the course of a session, the different endpoints of a session may take on the role of clients or servers depending on the direction of communication or behavior of the application. Likewise, in some cases, requests may be considered part of streaming sessions and are not limited to being single requests that synchronously wait for a single response.

As used herein, the term "response" refers to data that may be directed from a target resource to a client endpoint in an overlay network. Responses may be considered to include data or messages that may initiate, establish, or complete transactions, sessions, actions, or the like, based on requests from clients. In the course of a session, the different endpoints of a session may take on the role of clients or servers depending on the direction of communication or behavior of the application. Likewise, in some cases, responses may be considered part of streaming sessions and are not limited to being single responses to a single response.

As used herein, the term, "configuration information" refers to information that may include rule based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing access to network resources. In one or more of the various embodiments, a first mesh agent configured to provide a client with access via a secure tunnel provided by an overlay network that includes a plurality of mesh agents may be determined.

In one or more of the various embodiments, a route may be determined for a connection in the overlay network for one or more requests to access a resource from the client that is received by the first mesh agent, wherein a last mesh agent in the route provides the access to the resource over the connection.

In one or more of the various embodiments, the first mesh agent may be employed to determine an identity and an activity associated with the one or more requests based on network traffic such that the identity corresponds to an entity that may be authenticated to access the overlay network and the resource and such that the activity corresponds to one or more of an application or an application protocol that may be operative or available in the overlay network.

In one or more of the various embodiments, a policy container that is associated with the activity may be determined based on one or more characteristics of the one or more requests such that the policy container may include one or more policies associated with one or more activities.

In one or more of the various embodiments, the one or more requests may be validated based on the one or more policies included in the policy container such that the one or more validated requests may be forwarded to the resource and one or more invalidated requests may be discarded and such that persistence of the connection may be maintained during the validation of the one or more requests.

In one or more of the various embodiments, updating the policy container may cause further actions, including: determining one or more updated policies based on the updated policy container; determining one or more other activities associated with the identity based on the updated policy container and the network traffic; validating one or more other requests based on the one or more updated policies included in the updated policy container, wherein the one or more other validated requests are forwarded to the resource via the overlay network; or the like.

In one or more of the various embodiments, determining the policy container may include: determining the application protocol associated with the one or more requests based on a payload included in the one or more requests; parsing the payload based on the application protocol; determining a portion of the one or more policies associated with the parsed payload based on the identity and one or more of a protocol fragment, a regular expression, or a rule; executing one or more actions associated with the portion of the one or more policies to validate the one or more requests; or the like.

In one or more of the various embodiments, the policy container may be updated at an infrastructure security computer that may be separate from the first mesh agent and separate from the resource based on one or more of a rule or a user input. In some embodiments, the updated policy container may be communicated to the first mesh agent and each of the plurality of mesh agents.

In one or more of the various embodiments, authentication of the identity may include: communicating one or more credentials associated with the entity that corresponds to the identity to an infrastructure security computer associated with the overlay network; verifying that the one or more credentials are associated with the entity and with a privilege to access the overlay network and another privilege to access the resource; or the like.

In one or more of the various embodiments, validating the one or more requests may include: determining one or more credentials associated with the entity such that the one or more credentials may enable the entity to access the overlay network; determining a set of acceptable credentials associated with the one or more policies; in response to the one or more credentials being absent from the set of acceptable credentials, invalidating the one or more requests; or the like.

Illustrated Operating Environment

FIG. 1 shows components of one embodiment of an environment in which embodiments of the innovations disclosed herein may be practiced. Not all of the components may be required to practice these innovations, and variations in the arrangement and type of the components may be made without departing from the spirit or scope of these innovations. As shown, system 100 of FIG. 1 includes local area networks (LANs)/wide area networks (WANs)—(network) 110, wireless network 108, client computers 102-105, application server computer 116, infrastructure security computer 118, one or more mesh agent computers 120, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), extensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, infrastructure security computer 118, mesh agent computers 120, or other computers.

Client computers 102-105 may further be configured to include a client application that enables an end-user to log into an end-user account that may be managed by another computer, such as application server computer 116, infrastructure security computer 118, mesh agent computers 120, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to infrastructure security computer 118. Also, client computers may be arranged to enable users to display reports, interactive user-interfaces, results provided by infrastructure security computer 118, mesh agent computers 120, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, infrastructure security computer 118, mesh agent computers 120, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116, infrastructure security computer 118, and mesh agent computers 120 are described in more detail below in conjunction with FIG. 3. Although FIG. 1 illustrates application server computer 116, infrastructure security computer 118, and mesh agent computers 120 each as a single computer, the innovations or embodiments are not so limited. For example, one or more functions of application server computer 116, infrastructure security computer 118, and mesh agent computers 120, or the like, may be distributed across one or more distinct network computers. Moreover, in one or more embodiments, infrastructure security computer 118 may be implemented using a plurality of network computers. Further, in one or more of the various embodiments, application server computer 116, infrastructure security computer 118, or mesh agents 120 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
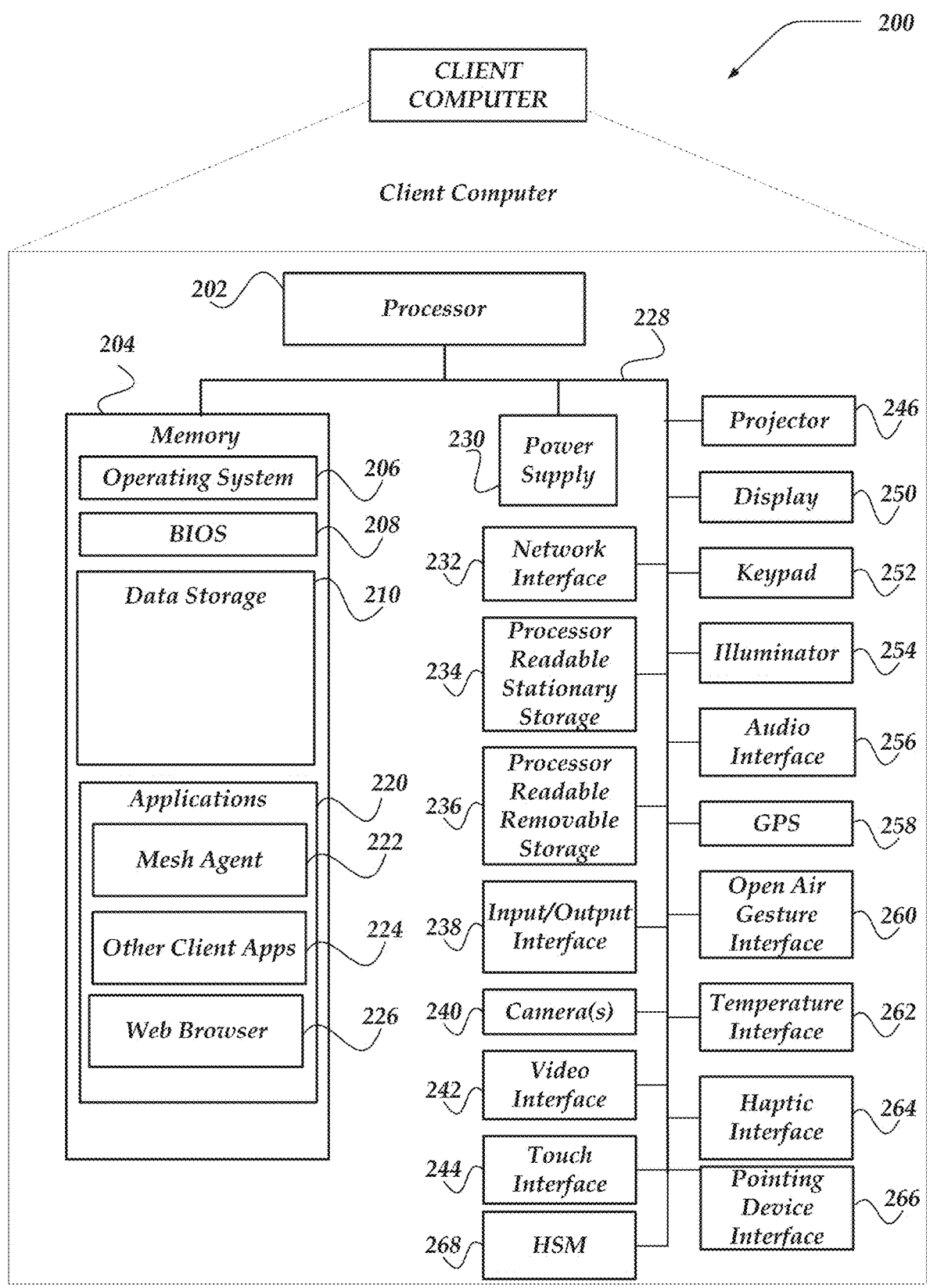
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX®, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by processors, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, mesh agent 222, other client applications 224, web browser 226, or the like. Client computers may be arranged to exchange communications, such as, queries, searches, messages, notification messages, event messages, alerts, log data, API calls, or the like, combination thereof, with application servers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
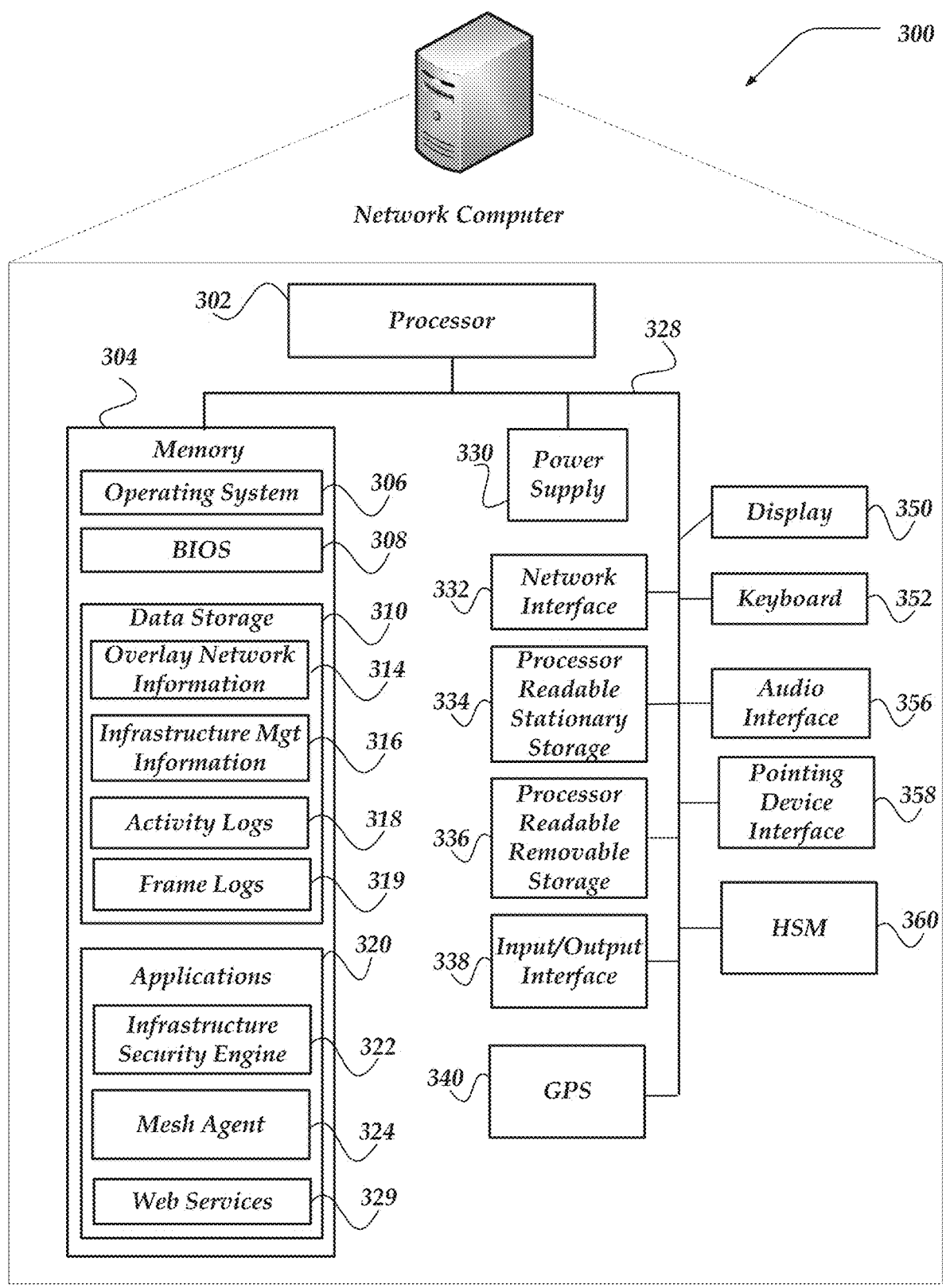
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, infrastructure security computer 118, or mesh agent computers 120 shown in FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, infrastructure security engine 322, mesh agent 324, web services 329, or the like, may be arranged to employ geo-location information to select one or more localization features, such as, time zones, languages, currencies, calendar formatting, or the like. Also, localization features may be used when interpreting network traffic, application protocols, modifying/localizing client requests, modifying/localizing server responses, user-interfaces, generating reports, monitoring infrastructure access in different regions, or the like. Localization may be employed by one or more internal processes or databases. In at least one of the various embodiments, geo-location information used for selecting localization information may be provided by GPS 340. Also, in some embodiments, geolocation information may include information provided using one or more geo-location protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX®, or Linux®, or a specialized operating system such as Microsoft Corporation's Windows® operating system, or the Apple Corporation's IOS operating system. Operating systems may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, overlay network information 314, infrastructure management information 316, activity logs 318, frame capture logs 319, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include infrastructure security engine 322, mesh agent 324, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, infrastructure security engine 322, mesh agent 324, web services 329, or the like, may be operative in a cloud-based computing environment. In one or more of the various embodiments, these applications, and others may be executing within virtual machines or virtual servers that may be managed in a cloud-based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to infrastructure security engine 322, mesh agent 324, web services 329, or the like, may be provisioned and de-commissioned automatically.

Also, in one or more of the various embodiments, infrastructure security 322, mesh agent 324, web services 329, or the like, may be located in virtual servers running in a cloud-based computing environment rather than being tied to one or more specific physical network computers. Likewise, in some embodiments, one or more of infrastructure security engine 322, mesh agent 324, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
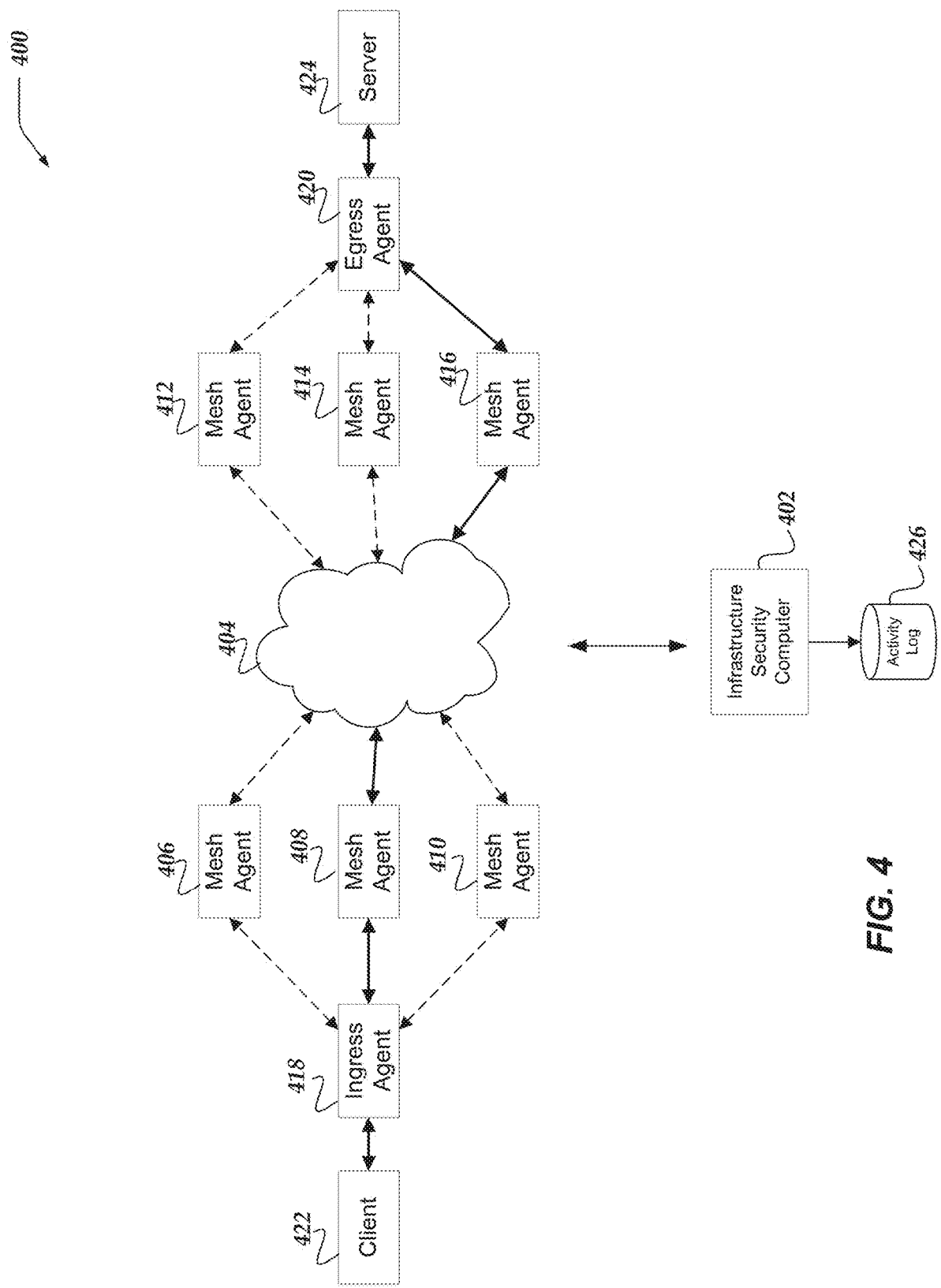
FIG. 4 illustrates a logical architecture of a system for identity and activity based network security policies in accordance with one or more of the various embodiments.

FIG. 4 illustrates a logical architecture of system 400 for identity and activity based network security policies in accordance with one or more of the various embodiments. In some embodiments, system 400 may comprise: one or more infrastructure security computers, such as, infrastructure security computer 402; one or more networks, such as, network 404; one or more mesh agents, such as, mesh agents 406-410 or mesh agents 412-416; one or more edge agents, such as, ingress agent 418 or egress agent 420; one or more clients, such as, client 422 or client 424; one or more activity log data stores, such as, activity log 426; or the like.

Note, one or more portions of system 400 illustrates a non-limiting example of a software defined network system or overlay network system. One of ordinary skill in the art will appreciate that other mesh network architectures or overlay network management schemes may be employed without departing from the scope of the innovations disclosed herein. However, the description of system 400 is sufficient for enabling one of ordinary skill in the art to understand the innovations disclosed herein.

In one or more of the various embodiments, mesh agents may be arranged to provide a software-defined overlay network that runs on one or more conventionally configured/provisioned physical (underlay) networks. In some embodiments, if a client application attempts to access resources managed by an infrastructure security service, the mesh agent used by clients to gain access to resources in a managed environment may be considered an ingress agent. Similarly, mesh agents that enable resource servers to respond to client request via the overlay network may be considered to be egress agents. Accordingly, in some cases mesh agents may be considered to be ingress agents in some contexts and they may be considered to be egress agents in other contexts. The different nomenclature is used herein as a convenience to describe features of embodiments in the different contexts.

In one or more of the various embodiments, infrastructure security computers, such as, infrastructure security computer 402, may host one or more infrastructure security engines that enforce a secure overlay network that provides managed access to one or more resources (or endpoints) in a networked environment.

In one or more of the various embodiments, if a client employs an mesh agent, such as, ingress agent 418, the ingress agent may be arranged communicate with infrastructure security computer 402 to authenticate the client request and determine a network path from the client to the target resource server via the overlay network.

In one or more of the various embodiments, mesh agents may be arranged to determine a next 'hop' to a next mesh agent. Accordingly, the next mesh agent, as well as, other mesh agents, may determine the next hop to a next mesh agent. Eventually, in some embodiments, the communication or request may reach an egress agent for the target resource server. And, in some embodiments, if each intervening mesh agent validates or authenticates the client communication, the client communication may reach the intended target resource server.

In one or more of the various embodiments, if an ingress agent receives a client request, the ingress agent may send a communication to an infrastructure security computer, such as, infrastructure security computer 402 to determine one or more authorized routes through the overlay network to reach the target resource server. In some embodiments, routes through the overlay network may be considered to be overlay paths or secure tunnels that go from mesh agent-to-mesh agent until the target server may be reached.

In one or more of the various embodiments, mesh agents may establish a cryptographically secure virtual network tunnel between clients and servers such that the client/server traffic may be opaque to observers or other network devices that may be unaffiliated with the infrastructure security computer.

Note, one of ordinary skill in the art will appreciate that system 400 may comprise one or more network devices, network computers, routers, switches, or the like, that comprise the underlay network. For brevity and clarity, the underlay network components are omitted from FIG. 4.

In one or more of the various embodiments, mesh agents may be considered to be hosted on physical or virtual computers that have access to the underlay networks. Also, in some embodiments, the number of overlay network hops (between/via mesh agents) between endpoints may be different than the actual network hops required by the underlay network. For example, for some embodiments, system 400 shows one overlay hop to get from ingress agent 418 to mesh agent 408. However, in some cases, there may be multiple hops in the underlay network (not shown) to exchange network traffic between ingress agent 418 and mesh agent 408. For example, in some embodiments, one hop in the overlay network may traverse one or more sub-networks that may require multiple hops through multiple underlay network routers.

In one or more of the various embodiments, if a client provides a request to communicate with a managed endpoint (e.g., resource server 424), the corresponding ingress agent (e.g., ingress agent 418) forwards information about the request to an infrastructure security computer (e.g., infrastructure security computer 402). Accordingly, in some embodiments, an infrastructure security engine (hosted on the infrastructure security computer) may be arranged to determine if the client user has permission to communicate with the target endpoint. Also, in some embodiments, the infrastructure security engine may be arranged to determine one or more next mesh agents where the ingress agent may forward the client request. Accordingly, in some embodiments, infrastructure security engines may be arranged to generate an overlay route table that includes one or more available mesh agents that may be candidates that may be suitable and authorized for handling the communication.

In some embodiments, the communication may be forwarded to subsequent mesh agents, each intervening mesh agent may be arranged to validate and authenticate the client communication using the infrastructure security engine. In some embodiments, if the client communication may be authorized, the infrastructure security engine may provide an overlay route table that identifies one or more mesh agents for the next hop through the overlay network.

In this example, the overlay path determined for client 422 to communicate with server 424 is ingress client 418 to mesh agent 408 to mesh agent 416 to egress agent 420 and ultimately to server 424. At the final mesh agent (e.g., egress agent 420), the egress agent may determine/obtain the credentials that enable access to the server. In some embodiments, egress agents may be arranged to communicate with an infrastructure security computer to obtain credentials for a server. In this example, the connections (double-arrow lines) illustrated with solid lines represent the determined route through the overlay network. In contrast, the connections (double-arrow lines) illustrated using dashed lines represent mesh agents that may be part of the overlay network that were not selected for a particular communication between client 422 and server 424.

In one or more of the various embodiments, ingress agents, egress agents, or mesh agents may be configured to capture or record activity that may associated with the communication through the secure tunnel. In this example, for some embodiments, activity log data store 426 represents a data store for storing logged or recorded activity for a managed infrastructure. In some embodiments, infrastructure security engines may be arranged to enable different types of activity logging. In some embodiments, infrastructure security engines may be configured to record one or more of the user information associated with an action, occurrence of actions, the accompanying application payload (if any), response from servers, or the like. Further, in some embodiments, infrastructure security engines may enable log information to be forwarded to another data store for storage or archival.

In one or more of the various embodiments, infrastructure security engines may be arranged to generate authenticity tokens that may act as a fingerprint for activity that may occur during the secure tunnel session. In one or more of the various embodiments, authenticity tokens may be generated based on the payload content, user identities, client identities, or the like, that may be associated with an overlay session. For example, if the secure tunnel session includes a response to a query, the authenticity token may be generated based on a hash of the response to the query. Among other things, in some embodiments, authenticity tokens may be employed as part of a scheme to determine the authenticity activity log information that may be stored elsewhere.

Figure 5:
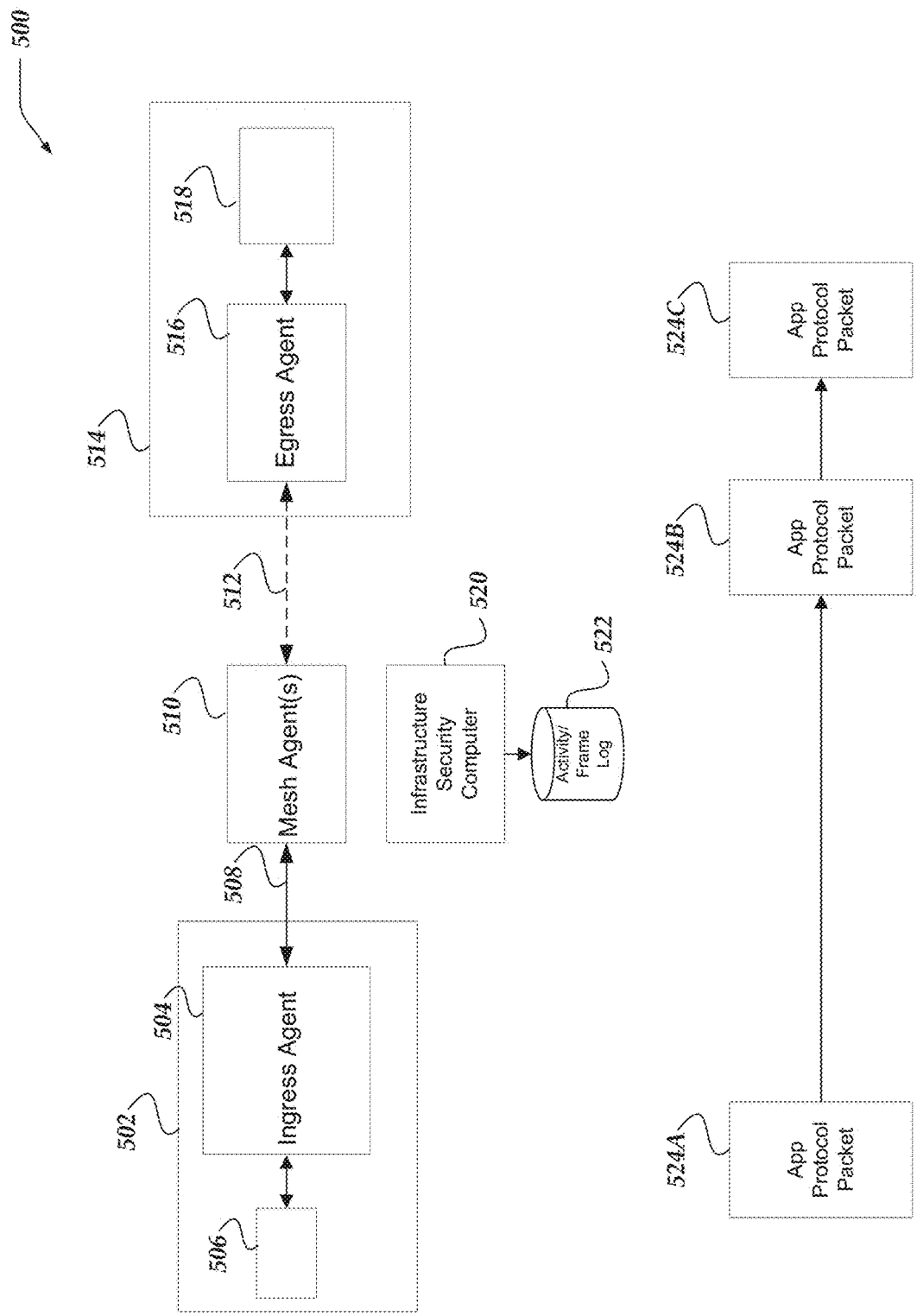
FIG. 5 illustrates a logical schematic of a system for identity and activity based network security policies in secured networks in accordance with one or more of the various embodiments.

FIG. 5 illustrates a logical schematic of system 500 for identity and activity based network security policies in secured networks in accordance with one or more of the various embodiments. in this example, for some embodiments, system 500 includes client computer 502, ingress agent 504, client application 506, mesh agent(s) 510, target resource computer 514, egress agent 516, resource server 518, infrastructure security server 520, log data store 522. Note, in some embodiments, ingress agents may be considered mesh agents that a client application employs to communicate via an overlay network. Similarly, in some embodiments, egress agents may be considered mesh agents that communicate with server applications. Note, as mentioned above, ingress agents and egress agents may be considered mesh agents that may provide ingress or egress of traffic in the overlay network. Thus, for brevity and clarity mesh agents may be referred to as ingress agents, egress agents, or mesh agents depending on their immediate role in an overlay communication session.

In this example, for some embodiments, network path 508 may represent communication over a single overlay network hop of a secure tunnel that may comprise one or more underlay network hops to reach the computer that is hosting mesh agent 510. Likewise, network path 512 may represent one or more overlay network hops (intervening mesh agents not shown) that reach target computer 514 and egress agent 516.

As described above, in some embodiments, mesh agents may be arranged to communicate with infrastructure security engines that may be hosted on infrastructure security computers, such as, infrastructure security computer 520. Also, in some embodiments, infrastructure security engines may be arranged to log overlay session activity into activity log data store 522.

In one or more of the various embodiments, client applications, such as, client application 506 may employ one or more application protocols to communicate with resource servers, such as, resource server 518. In some embodiments, application protocols may define particular data in particular arrangements or sequences that enable client applications to communicate with associated/related server applications. In some embodiments, two or more applications or services may share the same application protocol. Also, in some embodiments, one or more applications may employ unique or custom protocols to enable communication between clients or servers. In some embodiments, servers may provide one or more APIs or interfaces that enable applications to access the servers rather than requiring dedicated/proprietary client applications. In such circumstances, a program or service configured to employ such APIs or interfaces may be considered a client application.

In some embodiments, application protocol packets originating from client applications may be provided to ingress agents and subsequently forwarded through the overlay network until they reach the egress agent. Accordingly, in some embodiments, egress agents may be arranged to act as an endpoint to the connection from the client application.

In this example, for some embodiments, application protocol packet 524A represents one or more packets of network traffic that may be sent from a client application, such as, client application 506. Accordingly, the application protocol packet may be routed through the overlay network until it reaches its egress agent. In this example, application protocol packet 524B represents the application protocol packet at the egress agent for the client request. And, in this example, for some embodiments, application protocol packet represents application protocol packets sent from an egress agent to the target resource server.

In one or more of the various embodiments, mesh agents including ingress agents or egress agents may be arranged to re-write application protocol packets to enforce one or more policies in the overlay network. For example, if an application protocol defines one or more fields for holding credential information, a policy may be provided such that egress agents may be arranged to insert the appropriate credential information into the application protocol packets before communicating them to the target resource server. Thus, in some embodiments, credential information provided by the client (if any) may be automatically replaced by other credential information determined by the egress agent as directed by its infrastructure security computer.

Accordingly, in some embodiments, egress agents may be arranged to communicate with infrastructure security computers to obtain credential instructions that declare one or more actions the egress agent may perform to obtain or activate credential information to access the target resource server. In some embodiments, egress agents may be arranged to replace the credential information included in application protocol packet 524B (if any) with credential information determined based on credential instructions provided by its associated infrastructure security computer. Further, in some embodiments, egress agents may be arranged to perform one or more 'fix-up' operations on application protocol packet 524B, such as, computing hash signatures based on packet content, adjusting packet size field values, adjusting sequence numbers, adjusting packet offset/pointer values (e.g., values that point to the location of particular values or sections in a given packet), or the like. Accordingly, in some embodiments, application protocol packet 524C represent a modified packet that includes credential information as well as other packet modifications that may be required for a particular application protocol or credential mechanism.

Figure 6:
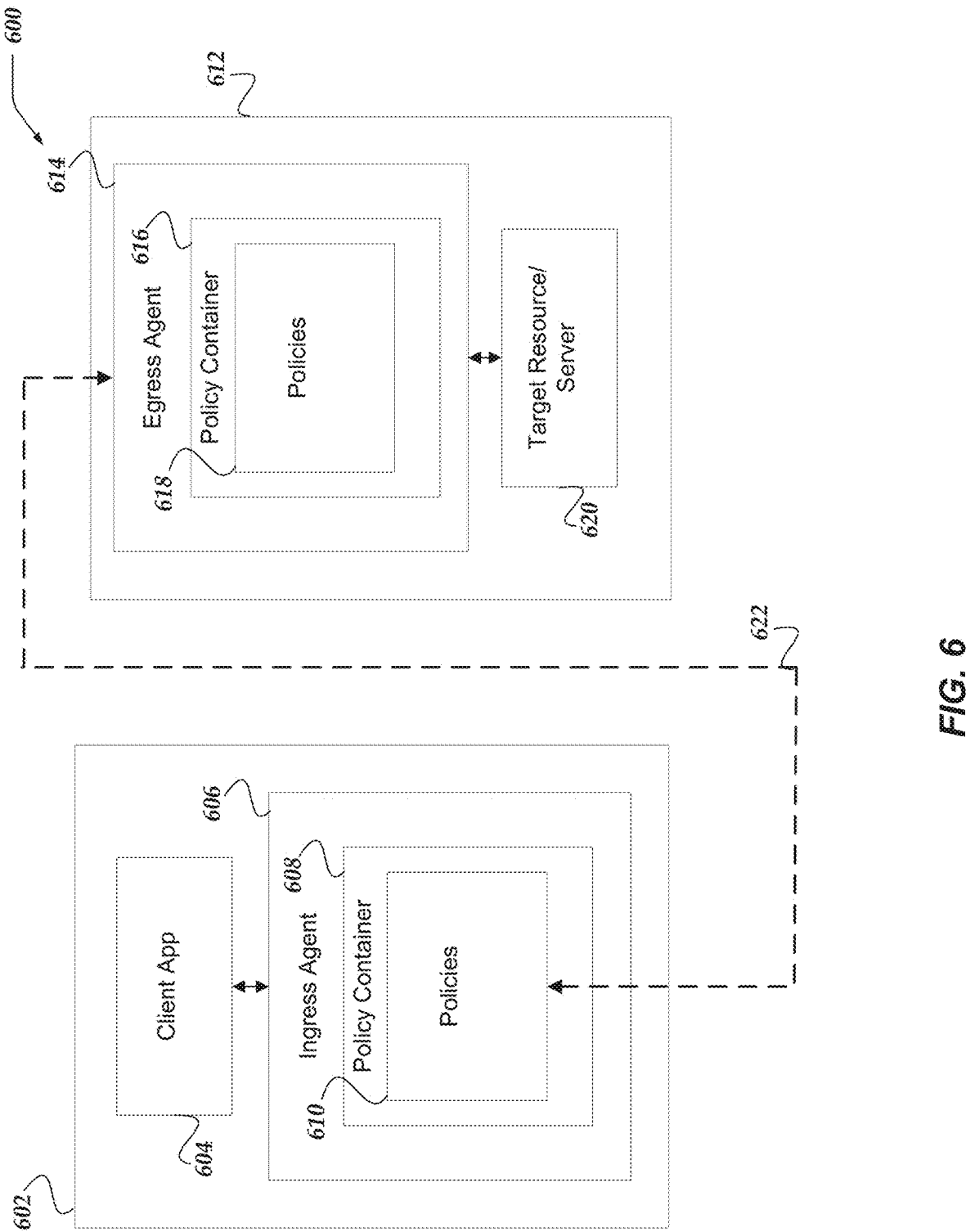
FIG. 6 illustrates a logical schematic of a system for identity and activity based network security policies in accordance with one or more of the various embodiments.

FIG. 6 illustrates a logical schematic of system 600 for identity and activity based network security policies in accordance with one or more of the various embodiments. In some embodiments, systems, such as, system 600 may include client computer 602, client application 604, ingress agent 606, policy container 608, policies 610, network computer 612, egress agent 614, policy container 616, policies 618, target resource server 620, or the like. Further, in this example, path 622 represents a network connection between client computer 602 and network computer 612 as facilitated by ingress agent 606 and egress agent 614.

As described above, in one or more of the various embodiments, ingress agents and egress agents may be arranged to establish a secure network path between a client application, such as, client application 604 and target resources, such as, target resource 620.

As described above, mesh agents, including, ingress agents or egress agents may be enabled to inspect or modify network traffic exchanged between client applications and protected target resources. Accordingly, in some embodiments, mesh agents may be arranged to employ one or more policies included in policy containers that may include rules, instructions, parsers, grammars, or the like, directed to one or more application protocols that particular client applications and target resources may employ to communicate.

Herein, for brevity and clarity, network traffic, such as, traffic over connection 622 may be referred to as requests or responses such that clients may send/provide requests and target resources may send/provide responses. One of ordinary skill in the art will appreciate that the requests or responses may be part of ongoing/continuous sessions rather than being limited to strict one-for-one exchanges of requests and responses. For example, policies may be applied to data packets that comprise streaming video, streaming data, streaming audio, or the like.

In one or more of the various embodiments, particular policies for particular application protocols may be included in policy containers, such as, policy container 608 and policy container 616. In some embodiments, policy containers may be arranged to include one or more policies that declare access rules for one or more resources or network segments.

In some embodiments, policy containers may be associated with one or more application protocols, applications, or the like. For brevity, policy containers may be described as being associated with activities. For example, a policy container may be associated with HTTP traffic while another policy container may be associated with a database application. Accordingly, in some embodiments, policies in a given policy container may be directed to enforcing policies on for a particular activity. Note, one of ordinary skill in the art will appreciate that the definition or declaration of an activity may vary depending on local requirements or local circumstances. Accordingly, in some embodiments, infrastructure security computers may provide user interfaces or configuration information that enable administrators of overlay networks to have broad authority to define or declare activities that may be relevant.

Figure 7:
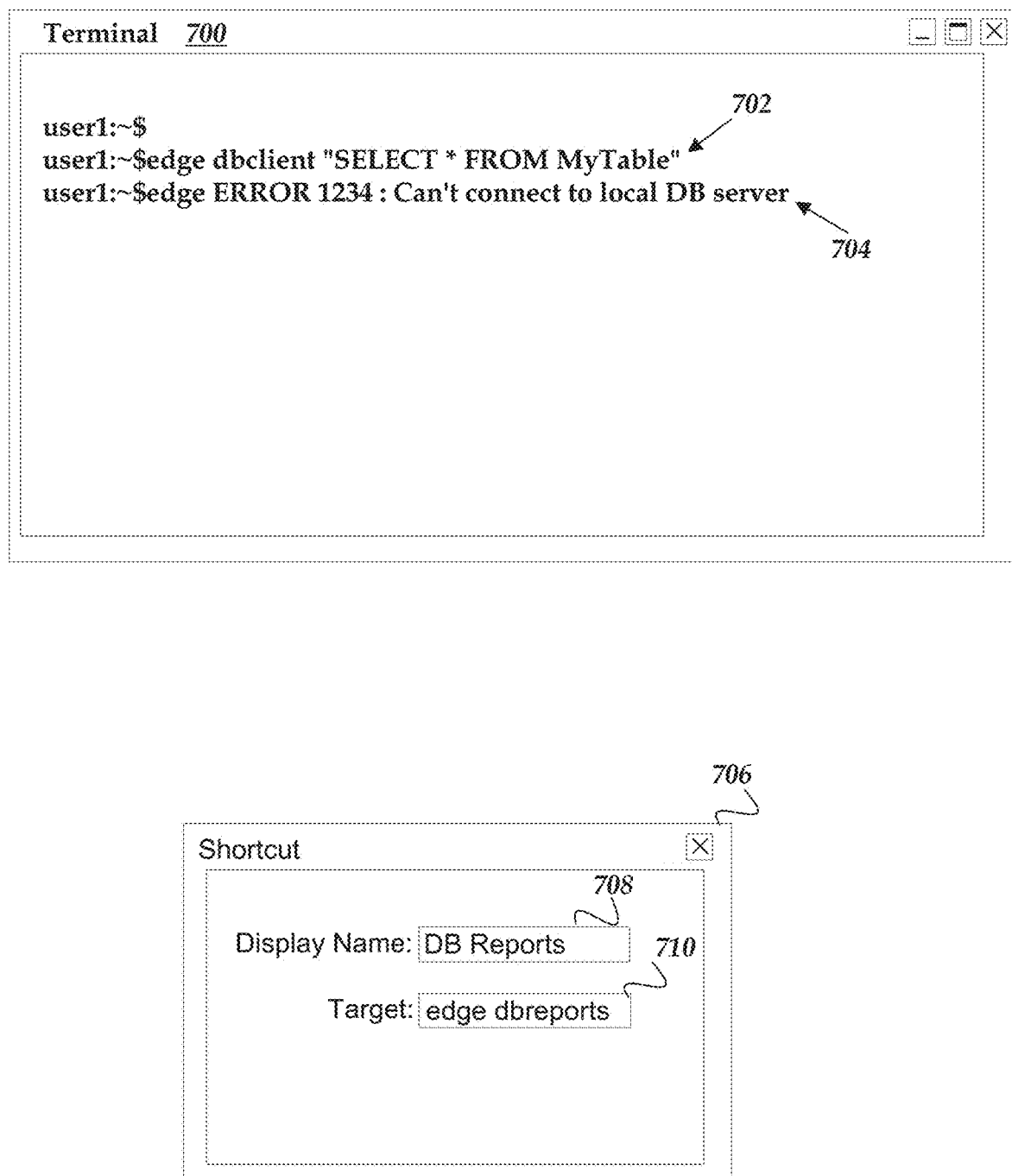
FIG. 7 illustrates a logical schematic of a terminal and shortcut 706 for managing and monitoring endpoint activity in secured networks in accordance with one or more of the various embodiments.

FIG. 7 illustrates a logical schematic of terminal 700 and shortcut 706 for identity and activity based network security policies in accordance with one or more of the various embodiments. In some embodiments, terminal 700 may represent a computer terminal application that enables users access to command-line interfaces for various applications. In this example, for some embodiments, command line 702 represents a command line that may be provided by a user. In this example, the user is attempting to retrieve data from a remote database using the program dbclient. In the example, the command 'dbclient' is shown as prefixed by the command 'edge'. Accordingly, in this example, the prefix represents a command to employ an ingress agent to execute the dbclient. Accordingly, in this example, rather than routing the dbclient command via the conventional underlay network, the ingress agent may capture the execution of dbclient and employ the overlay network to establish a secure tunnel for the requested operation.

Similarly, in some embodiments, shortcut 706 illustrates how a shortcut for a GUI based operating system or window manager may be configured to route commands initiated from a desktop (e.g., mouse-clicks) through secure tunnels in the overlay network. In this example, shortcut 706 includes an application display name, such as, display name 708 and a launch/execution command represented by target 710. Thus, in this example, shortcuts may be configured to enable launched applications to access the overlay network.

Note, often client applications may support users providing server identifiers (e.g., URIs, IP addresses, hostnames, or the like) that declare the server that for the client application. For example, a conventional command to launch a dbclient application may include the hostname where the database server of interest is located. However, for resources in the overlay network, the infrastructure security engines may determine the location of the server.

Figure 8:
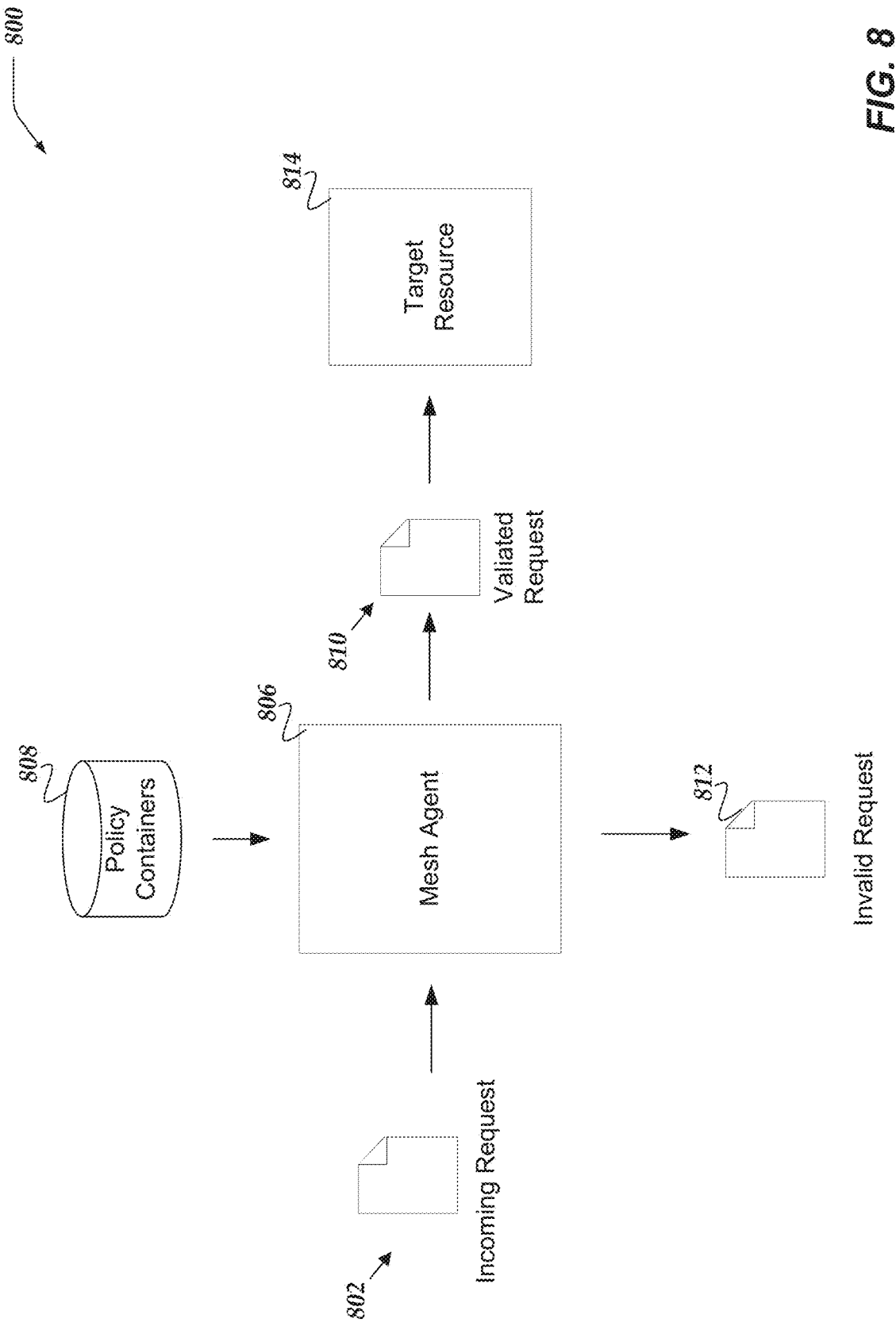
FIG. 8 illustrates a logical schematic of a system for identity and activity based network security policies in accordance with one or more of the various embodiments.

FIG. 8 illustrates a logical schematic of system 800 for identity and activity based network security policies in accordance with one or more of the various embodiments. As described above, in some embodiments, client requests, such as, client request 802 may be provided to mesh agents, such as, mesh agent 806. Accordingly, in some embodiments, mesh agents may be arranged to apply one or more policies included in policy containers, such as, policy containers 808 to validate if the request may be forwarded to a next mesh agent in the secure tunnel (not shown) or to the ultimate destination, such as target resource 814.

Also, in some embodiments, if the request may be invalidated based on one or more policies, the request may be rejected or discarded as represented by invalid request 812.

In some embodiments, policies may be declared the perform other actions, such as generating notifications, collecting metrics, activity logging, data masking, data substitution, or the like, rather than being limited to validating/invalidating requests or responses. Accordingly, in some embodiments, some policies may pass through modified requests/responses.

Figure 9:
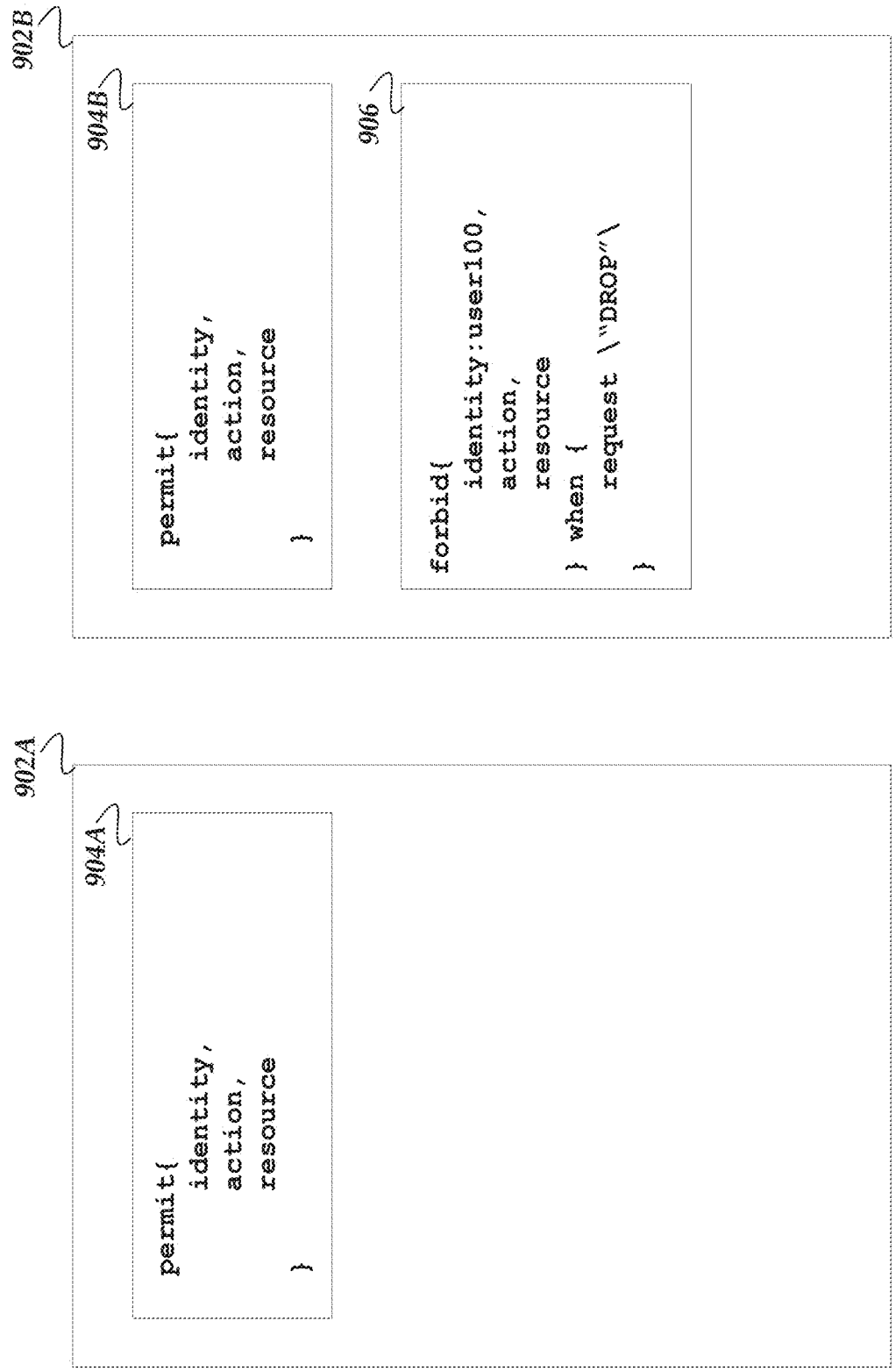
FIG. 9 illustrates a logical schematic of a policy container for identity and activity based network security policies in accordance with one or more of the various embodiments.

FIG. 9 illustrates a logical schematic of a policy container for identity and activity based network security policies in accordance with one or more of the various embodiments. As discussed herein, in some embodiments, mesh agents may be arranged to apply one or more policies to evaluate requests or responses that may be flowing through an overlay network. In some embodiments, policies may be grouped or included in policy containers. Accordingly, in some embodiments, each policy container may include one or more policies that may be applied to requests or responses. Note, generally these innovations may be applied in either direction of a communication flow depending on the policy configuration. Accordingly, in some cases, for brevity, a feature of these innovations may be described in terms of a request or a response. In such cases, one of ordinary skill in the art may assume that the feature may be applied to requests or responses unless it is clear from the supporting language that a feature exclusively applies to one (e.g., a request) and not the other.

Similarly, in some embodiments, policies may be declared the perform other actions, such as generating notifications, collecting metrics, activity logging, data masking, data substitution, or the like, rather than being limited to validating/invalidating requests or responses. Accordingly, in some embodiments, some policies may pass through modified requests/responses.

In some embodiments, infrastructure security engines may update one or more policy containers. Such updates may include adding policies, removing policies, or updated policies that may be associated with policy containers. Also, in some embodiments, infrastructure security engines may be arranged to provide additional policy containers. In some embodiments, if a policy container may be updated, infrastructure security engines may be arranged to distribute the updated policy containers to the mesh agents that comprise the overlay network.

In some embodiments, policy containers may be updated while a secure session between a client and resource may be active. Accordingly, in some embodiments, policy enforcement at the mesh agents in overlay networks may be modified in real-time without interaction with the client or interaction with the target resource.

In one or more of the various embodiments, policy containers may be associated with one or more activities that may include applications, application protocols, resource types, application types, or the like. In some embodiments, infrastructure security engines may be arranged to maintain an index, map, dictionary, or the like, that associate policy containers with one or more activities.

Also, in some embodiments, infrastructure security engines may be arranged to support one or more policy description languages to define policies included in policy containers. In some cases, these policy description languages may be conventional or standard policy description languages. Also, in some embodiments, infrastructure security engines may be arranged to support one or more custom policy description languages. In some embodiments, infrastructure security engines may be arranged to support policies defined using general purpose computer languages, such as, Go, Javascript, Python, C, C++, Rust, or the like. Accordingly, in some embodiments, infrastructure security engines may be arranged to employ grammars, parsers, libraries, instructions, or the like, provided or declared in configuration information to interpret policy description languages to account for local requirements or local circumstances.

In this example, for some embodiments, policy container 902A represents a policy container that includes policy 904A. In this example, it may be assumed that policy container 902A is associated with an activity such as actions performed by an application or application protocol that may be operative or available in the overlay network.

In this example, policy container 902A may be assumed to evaluate requests directed to one or more particular applications or one or more particular application protocols. Accordingly, in this example, policies, such as policy 904A may be employed to evaluate such requests or responses. In this example, for some embodiments, policy 904A represents a policy that enables requests or responses associated with any identity or any actions to be considered validated.

In response to an infrastructure security engine updating policy container 902A, infrastructure security engines may distribute the updated policy containers to mesh agents that comprise the overlay network. In this example, policy container 902B may represent the updated policy container and policy 904B may be considered to represent the same policy as policy 904A (here assuming it was not changed by the update to the policy container). Accordingly, in this example, policy 906 represents a policy that was added to policy container 902A to create policy container 902B. In this example, policy 906 may be considered to reject requests from entities corresponding to identity user 100 if the request payload includes a word or string that matches the pattern "DROP" such as DROP TABLE, DROP INDEX, DROP USER, and so on. For example, if policy container 902A/902B is mapped to database activities, the entity (e.g., user or service) associated with identity user 100 may be barred from issuing SQL commands that may result in database objects (e.g., tables, indexes, or the like) being deleted from the target resource (e.g., a database server).

Generalized Operations

FIGS. 10-13 represent generalized operations for identity and activity based network security policies in accordance with one or more of the various embodiments. In one or more of the various embodiments, processes 1000, 1100, 1200, and 1300 described in conjunction with FIGS. 10-13 may be implemented by or executed by one or more processors on a single network computer such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based or containerized environment. However, embodiments are not so limited and various combinations of network computers, client computers, or the like may be utilized. Further, in one or more of the various embodiments, the processes described in conjunction with FIGS. 10-13 may be used for identity and activity based network security policies in accordance with at least one of the various embodiments or architectures such as those described in conjunction with FIGS. 4-9 Further, in one or more of the various embodiments, some or all of the actions performed by processes 1000, 1100, 1200, and 1300 may be executed in part by infrastructure security engine 322, one or more mesh agents, such as, mesh agent 324, or the like, running on one or more processors of one or more network computers.

Figure 10:
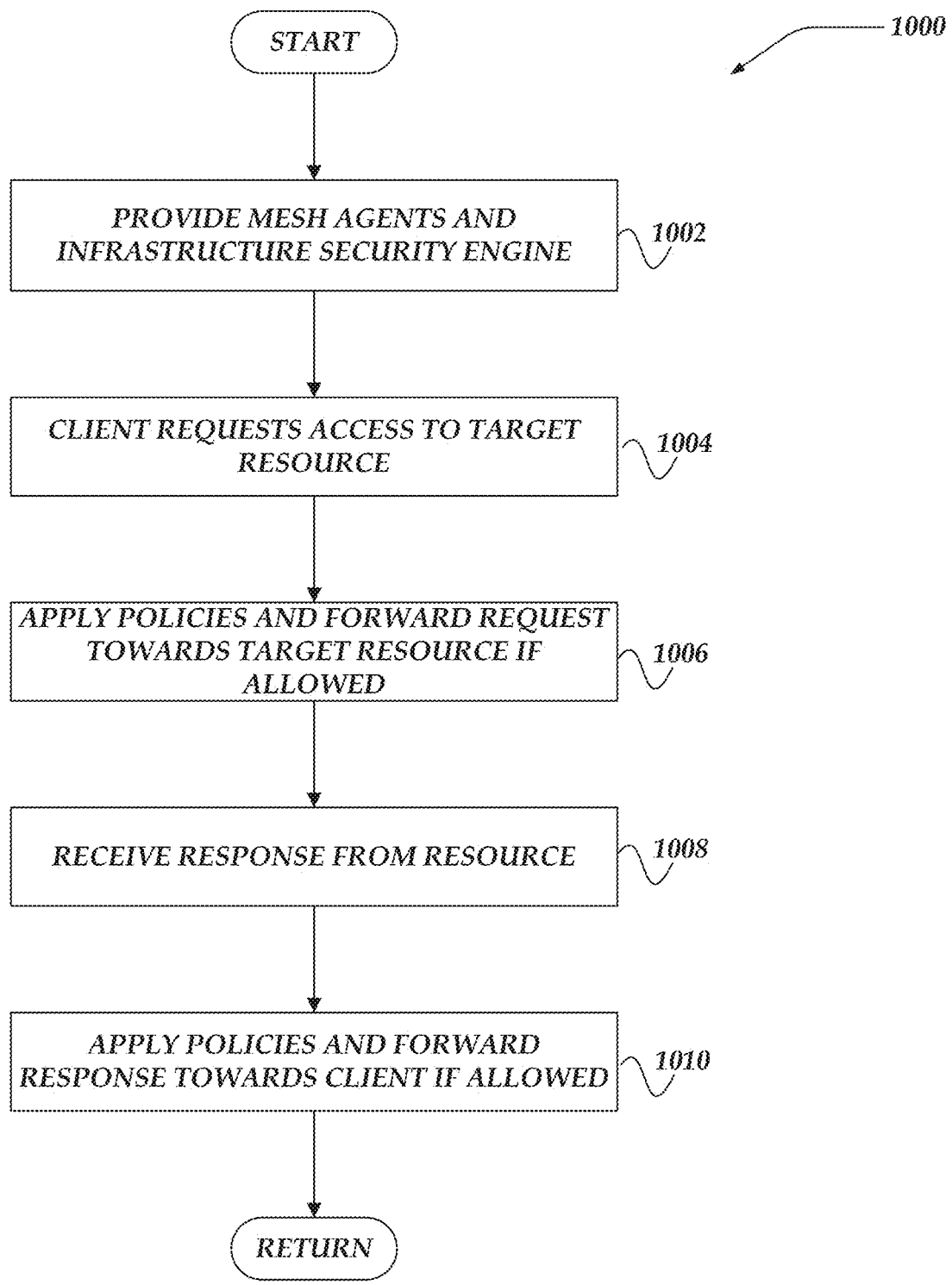
FIG. 10 illustrates an overview flowchart of a process for identity and activity based network security policies in accordance with one or more of the various embodiments.

FIG. 10 illustrates an overview flowchart of process 1000 for identity and activity based network security policies in accordance with one or more of the various embodiments. After a start block, at block 1002, in one or more of the various embodiments, one or more mesh agents and one or more infrastructure security engines may be provided. As described above, mesh agents may be deployed in an underlay network where an infrastructure security computer may be arranged to dynamically configure the mesh agents to establish an overlay network.

At block 1004, in one or more of the various embodiments, clients may request access to a target resource. In some embodiments, client applications may be configured to send requests that may be routed via mesh agents to the target resource. In some embodiments, the mesh agent that may be directly communicated to by the client may be considered to be an ingress agent for the session because it enables the client to access the overlay network.

At block 1006, in one or more of the various embodiments, mesh agents may be arranged to apply one or more policies before the request may be forwarded towards the target resource if allowed by the relevant policies. As described above, infrastructure security computers may be arranged to promulgate policy information by pushing policy containers to mesh agents to enforce the policies of the overlay network. In some embodiments, these policies may be enforced irrespective of how the target resource may be configured. For example, if a target resource is configured to support request-type A, a policy enforced in the overlay network may block or restrict request-type A requests. For example, if a database is enabled to allow remote users to drop tables, the overlay network may enforce a policy that disables remote users from dropping tables.

At block 1008, in one or more of the various embodiments, mesh agents may be arranged to receive responses from the target resource. Similar to how clients access the overlay network, resources responding to requests may also be configured to respond via the overlay network. Accordingly, in some embodiments, target resources may communicate responses to mesh agents that enable access to a secure tunnel to the client provided by the overlay network. Note, the mesh agent that enables resources to respond to requests may be referred to as egress agents since from the point-of-view of the client, the egress agent is the mesh agent at the end of the secure tunnel that directly communicates with the target resource.

At block 1010, in one or more of the various embodiments, mesh agents may be arranged to apply one or more policies and forward responses towards the clients, if allowed by the relevant policies. Responses may be forwarded to a sequence of mesh agents that form a secure tunnel between the ingress agent and the egress agent associated with the tunnel. Each intervening mesh agent as well as the ingress agent and egress agent may enforce one or more policies in the overlay network.

Next, in one or more of the various embodiments, control may be returned to a calling process.

Figure 11:
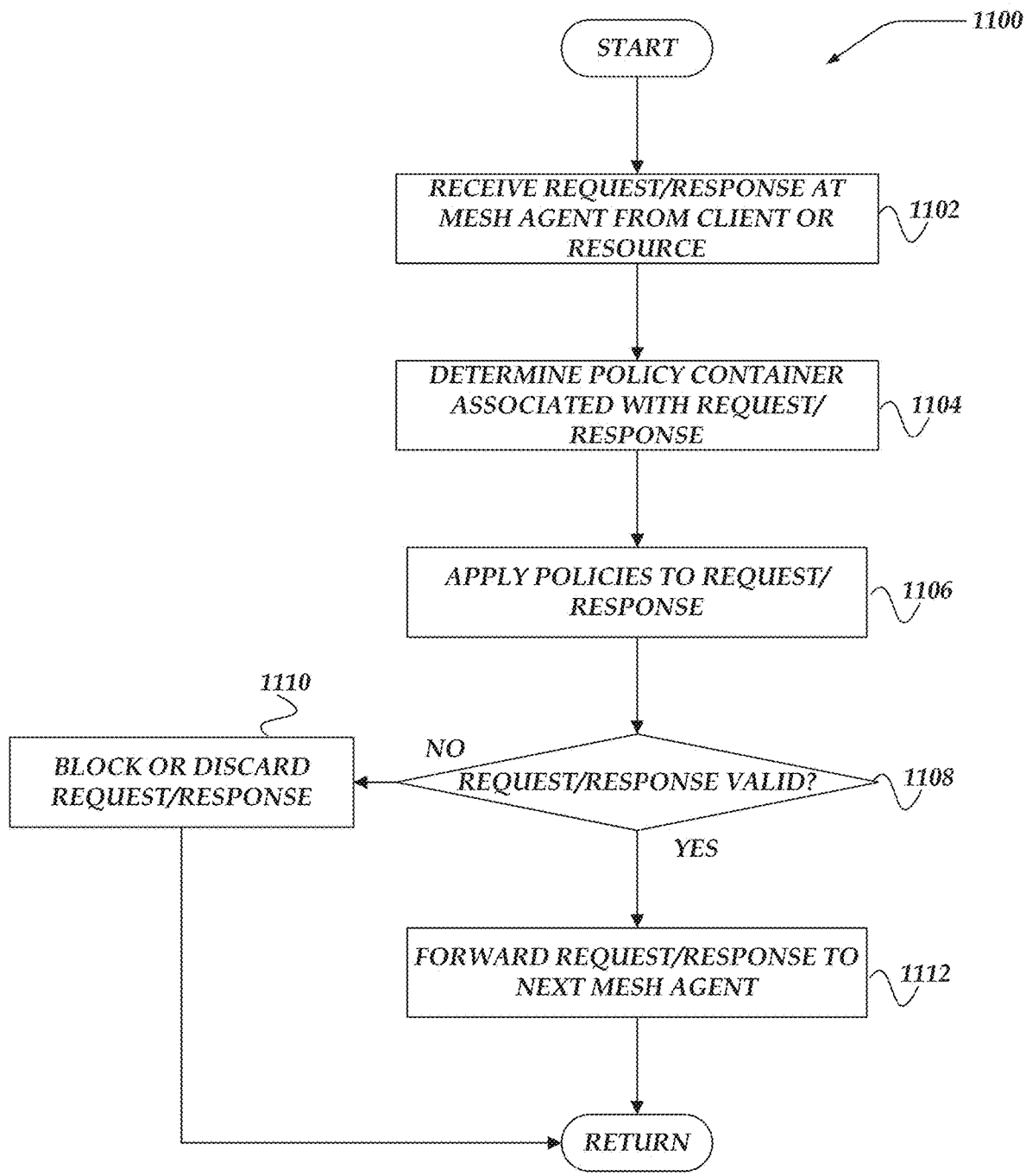
FIG. 11 illustrates a flowchart of a process for identity and activity based network security policies in accordance with one or more of the various embodiments.

FIG. 11 illustrates a flowchart of process 1100 for identity and activity based network security policies in accordance with one or more of the various embodiments. After a start block, at block 1102, in one or more of the various embodiments, mesh agents may be arranged to receive a request from a client or a response from a resource. In some embodiments, infrastructure security computers may provide route information for a secure tunnel in the overlay network between a client and a target resource. In some embodiments, the secure tunnel may be comprised of two or more mesh agents.

At block 1104, in one or more of the various embodiments, mesh agents may be arranged to determine one or more policy containers that may be associated with the request or response. In some embodiments, infrastructure security computers may be arranged to associate particular activities that may correspond to applications, application protocols, originating endpoints, resources, or the like, with one or more policy containers. For example, in some embodiments, a particular policy container may be associated with outbound HTTP traffic. Likewise, for example, another policy container may be associated with a network traffic/connections to a particular database server. In some cases, a request or response may be associated with more than one policy container. For example, a request from a using a particular application protocol may be associated with a policy container for the application protocol and another policy container for the server type (e.g., webserver, database, or the like). For example, an HTTP associated policy container may include policies that block or restrict HTTP traffic from particular servers/web-sites. While a policy container associated with the underlying application may include polices that may block or restrict requests or responses that include certain SQL expressions.

At block 1106, in one or more of the various embodiments, mesh agents may be arranged to apply the one or more policies to the request/response.

In one or more of the various embodiments, policy containers may include one or more policies that include rules, instructions, or the like, for implementing a particular policy. In some cases, policies may conform to one or more standard or customized policy description languages.

In one or more of the various embodiments, policies included in policy containers may be associated with one or more actions or one or more identities. In some embodiments, actions of interest for a policy may be declared within the policy itself using a policy description language. In some cases, policy containers may include a map, dictionary, or the like, that may be explicit associated policies with one or more actions.

In some embodiments, actions may be associated with applications. For example, particular SQL expressions may be considered actions that may be directed towards SQL databases.

In some embodiments, identities may represent users, services, machines, or the like, that the actions may be directed by or performed on behalf-of. As described above, infrastructure security computers may be arranged to assign identities to the entities (e.g., users, services, machines, or the like) that may be enabled to access overlay networks. Accordingly, in some embodiments, identities may be assigned or determined by an infrastructure security computer if a client is requesting access to a protected resource.

At decision block 1108, in one or more of the various embodiments, if the request or response may be determined to be valid, control may flow to block 1112; otherwise, control may flow to block 1110. In some embodiments, mesh agents may execute the one or more policies that may apply to the activity and identity associated with the request/response. In some embodiments, a policy may be configured to block or restrict requests/responses that do not conform to a policy. In some embodiments, if there may be two or more applicable policies, policies that block or restrict traffic may be enforced over other less restrictive policies. For example, in some cases, a first policy may be configured to mask sensitive fields in a response while a second policy may be configured to block the response. Accordingly, in this example, the mesh agent that may be applying the policies may block or restrict the response.

In some embodiments, if policy containers include multiple policies, the policies may be associated with priority values that may be used to determine priority ranking of the policies. Also, in some embodiments, mesh agents may be arranged to prioritize policies based on the order they appear in a policy container.

At block 1110, in one or more of the various embodiments, mesh agents may be arranged to block or discard the request or response. As described, in some embodiments, policies may be defined to perform a variety of actions, including validating or rejecting requests or responses. Accordingly, for brevity and clarity the innovations herein are generally described in terms of the policies validating requests/responses. However, one of ordinary skill in the art will appreciate that policies are not limited to validating requests/responses and may perform other actions, such as, data substitution, data masking, sending notification, raising alerts, collecting metrics, or the like.

At block 1112, in one or more of the various embodiments, mesh agents may be arranged to forward the request or response to a next mesh agent. As described above, in some embodiments, mesh agents may establish a secure tunnel that "hops" from one mesh agent to another mesh agent to connect the ingress agent and the egress agent. Accordingly, in some embodiments, some or all mesh agents that comprise the secure tunnel may similarly enforce one or more policies in the overlay network.

Next, in one or more of the various embodiments, control may be returned to a calling process.

Figure 12:
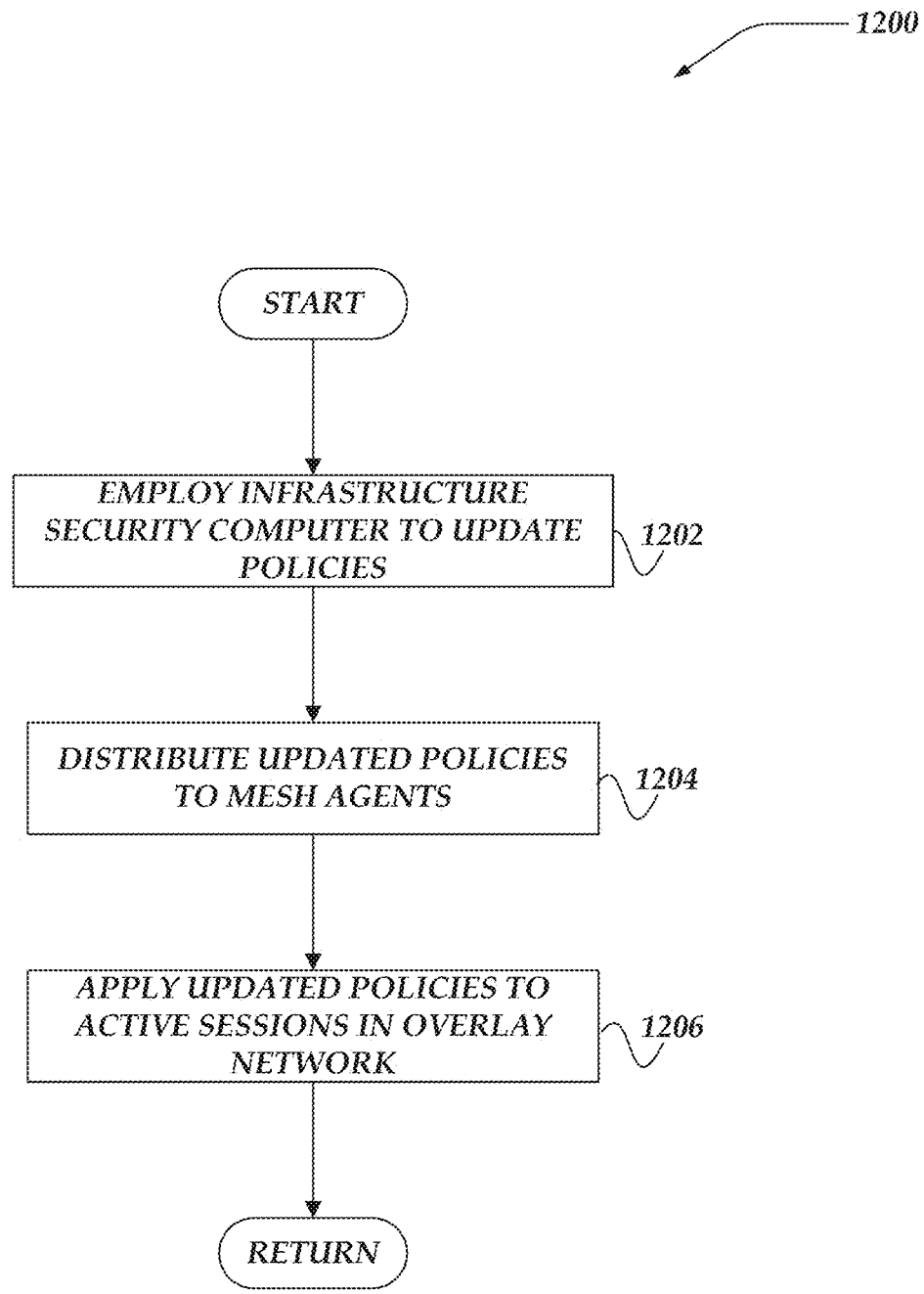
FIG. 12 illustrates a flowchart of a process for identity and activity based network security policies in accordance with one or more of the various embodiments.

FIG. 12 illustrates a flowchart of process 1200 for identity and activity based network security policies in accordance with one or more of the various embodiments. After a start block, at block 1202, in one or more of the various embodiments, infrastructure security engine may be arranged to update one or more policies. In some embodiments, infrastructure security computer may be arranged to provide one or more user interfaces that enable administrators to observe/monitor one or more metrics associated with activity in the overlay network. In some embodiments, this may include monitoring some or all of the network traffic that may be flowing through secure tunnels in the overlay network. For example, in some embodiments, a user interface may be arranged to display real-time information from active sessions (e.g., client/resource pairs). For example, in some embodiments, a user interface may display a dynamic list of clients and the resources they may be communicating with. Accordingly, in some embodiments, the user interface may enable administrators to interactively view the policy container(s) that may be associated with each secure tunnel or session in the overlay network.

In one or more of the various embodiments, such user interfaces may enable administrators to modify or update one or more policies in the policy containers. In some cases, such user interfaces may enable administrators to enter or modify policies by changing or adding policies using a policy description language. In other cases, in some embodiments, user interfaces may be arranged to enable administrators to modify policies by manipulating graphic user interface controls, such as, buttons, sliders, check boxes, text fields, or the like, such that the user interface interactions may be mapped to policy description language expressions that may include included in policy containers.

At block 1204, in one or more of the various embodiments, infrastructure security engines may be arranged to distribute the updated policy containers to the one or more mesh agents in the overlay network.

In one or more of the various embodiments, policy containers and the included policies may be stored in a data store that is part of or otherwise managed by the infrastructure security computer. Accordingly, infrastructure security computers may be arranged to publish the updated policy containers to mesh agents in the overlay network. In some cases, for some embodiments, modified policy containers may be automatically pushed to each mesh agent included the overlay network. In other cases, for some embodiments, infrastructure security computers may be configured to selectively push the modified policy containers to one or more mesh agents in the overlay network.

Note, in some embodiments, pushing updated policy containers or policies to mesh agents may not interfere with the existing/active sessions unless the updated policy containers may be associated with activities being conducted in a session.

At block 1206, in one or more of the various embodiments, mesh agents may be arranged to apply the updated policies to active sessions in the overlay network. In some embodiments, if mesh agents may be provided updated policy containers, the mesh agents may be arranged to determine if one or more of the active sessions (secure tunnels) performing activities may be associated with the updated policy containers. Accordingly, in some embodiments, if a match may be found, the mesh agent may immediately apply or enforce the policies included in the updated policy container. Also, in some embodiments, mesh agents may be arranged to update its local collection of policy containers and begin immediately applying them to traffic passing through secure tunnels that runs through the mesh agent.

For example, in some embodiments, a client in an overlay network may establish a session to a website/website and begin exchanging requests/responses. If in this example, the website may be observed sending restricted content to the client, an administrator may modify the policy container for HTTP protocol by adding a policy that blocks the restricted content. Thus, in this example, the infrastructure security computer may push the updated policy container to the mesh agents in the overlay network resulting in the restricted content being blocked without terminating the secure tunnel or the HTTP session.

Next, in one or more of the various embodiments, control may be returned to a calling process.

Figure 13:
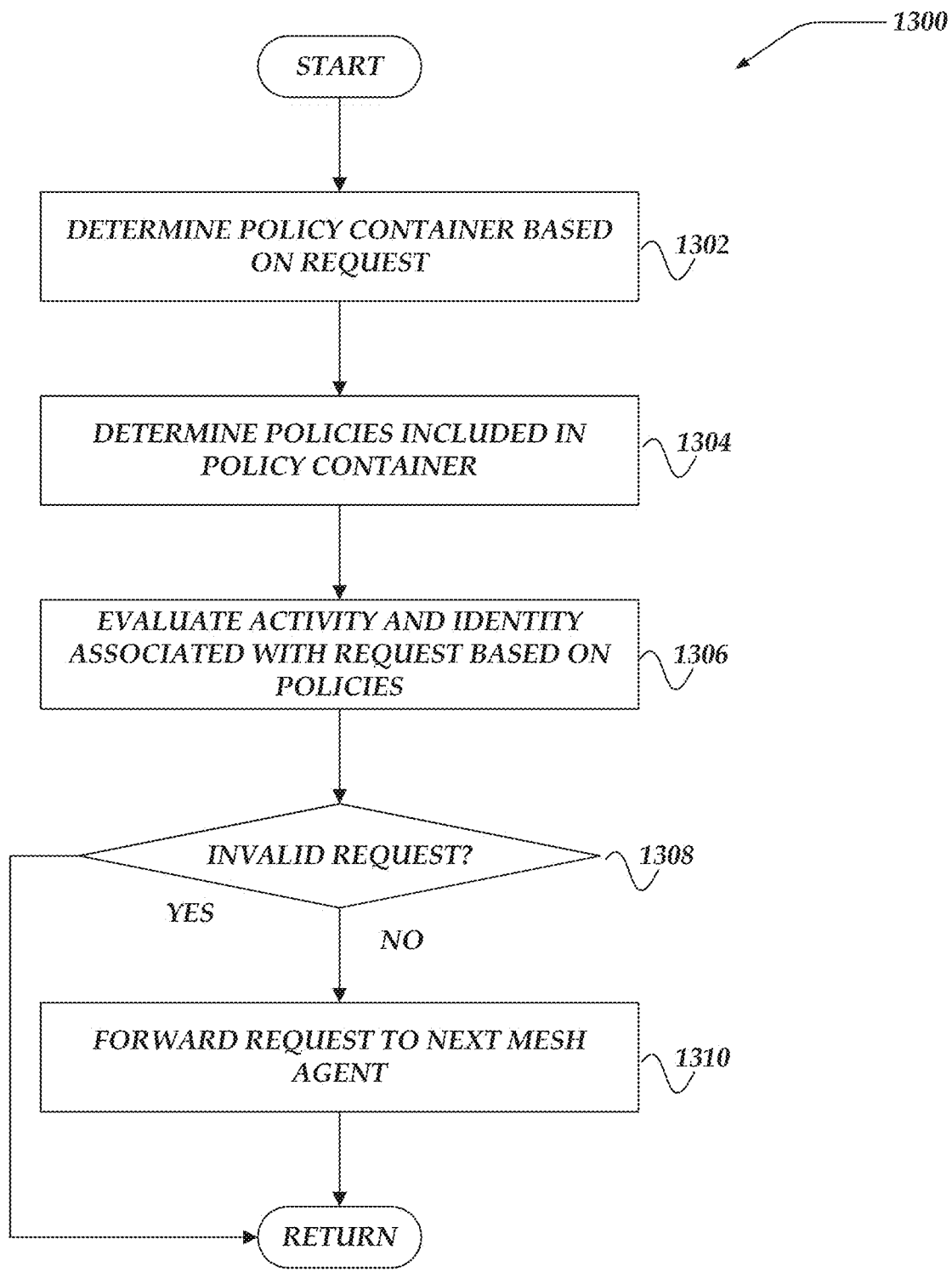
FIG. 13 illustrates a flowchart of a process for identity and activity based network security policies in accordance with one or more of the various embodiments.

FIG. 13 illustrates a flowchart of process 1300 for identity and activity based network security policies in accordance with one or more of the various embodiments. After a start block, at block 1302, in one or more of the various embodiments, mesh agents may be arranged to determine one or more policy containers based on the request. In some embodiments, if a client attempts to request access to a protected resource, the infrastructure security computer responsible for managing access in the overlay network may be arranged to authenticate the entity associated with request, determining an identity that may be correspond to the entity. Also, in some embodiments, if a client attempts to request access to a resource, the infrastructure security computer responsible for the overlay network may be arranged to determine the activity associated with the request. In some embodiments, infrastructure security computer may be arranged to determine the activity based on one or more the application protocol used by the request, an application named or otherwise associated with the request, the client making the request, or the like. Also, in some embodiments, infrastructure security computers may be arranged to inspect the contents of the request for a more fine grained determination of activities. For example, if the application protocol is RDP (remote desktop protocol), the infrastructure security computer may be arranged to look into the RDP payload to determine a particular activity, such as, editing a word-processor document.

In some embodiments, if the activity may be determined the mesh agent may be arranged to determine if its collection of policy containers includes one or more policy containers that may be associated with the activity.

In one or more of the various embodiments, mesh agents may be arranged to locally store one or more policy containers that may be determined for a session. Also, in some embodiments, mesh agents may be arranged to obtain the relevant policy containers from the infrastructure security computer along with routing or authentication instructions provided by the infrastructure security computer if establishing a secure tunnel.

At block 1304, in one or more of the various embodiments, mesh agents may be arranged to determine one or more policies included in the policy containers. As described above, policy containers may be arranged to include one or more policies that the mesh agents may execute to enforce policy in the overlay network.

At block 1306, in one or more of the various embodiments, mesh agents may be arranged to evaluate the activity and identity associated with the request based on the one or more policies.

At decision block 1308, in one or more of the various embodiments, if the request may be invalid, control may be returned to a calling process; otherwise, control may flow to block 1310. Note, as described above, policies are not limited to validation or requests or responses. For example, in some embodiments, policies may be configured to modify the contents of requests or responses, generate alerts or notifications, collect metrics, or the like, rather than being limited to validating/invalidating requests or responses.

At block 1310, in one or more of the various embodiments, mesh agents may be arranged to forward the request to a next mesh agent. As described above, in some embodiments, mesh agent may be provided information from infrastructure security computer that declares a route or path through the overlay network that mesh agents may employ to determine the next mesh agent.

Next, in one or more of the various embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing access to network resources in a network using one or more processors that are configured to execute instructions, wherein the execution of the instructions enables performance of actions, comprising:
   determining a first mesh agent on a logical edge of an overlay network that is configured to provide a client with access via a secure tunnel provided by the overlay network that includes a plurality of mesh agents;
   determining a route for a connection in the overlay network for one or more requests to access a resource from the client that is received by the first mesh agent, wherein a last mesh agent in the route is configured to provide access to the resource over the connection;
   employing the first mesh agent to determine an identity and an activity associated with the one or more requests based on network traffic, wherein the identity corresponds to an entity that is authenticated to access the overlay network and the resource, and wherein the activity corresponds to one or more of an application or an application protocol that is operative or available in the overlay network;
   determining a policy container that is associated with the activity and based on one or more characteristics of the one or more requests by performance of further actions, including:
   determining the application protocol associated with the one or more requests based on a payload included in the one or more requests;
   parsing the payload based on the application protocol;
   determining a portion of the one or more policies associated with the parsed payload based on the identity and one or more of a protocol fragment, a regular expression, or a rule; and executing one or more actions associated with the portion of the one or more policies to validate the one or more requests;

wherein the policy container includes one or more policies that are associated with a declared definition for relevancy of the activity that is based on one or more of a local requirement or a local circumstance; and distributing the policy container to the plurality of mesh agents for validation of the one or more requests based on the one or more policies included in the policy container associated with the activity, wherein the one or more validated requests are forwarded to the resource and one or more invalidated requests are discarded, and wherein persistence of the connection is maintained during the validation of the one or more requests; and updating the policy container with an association with another activity that is associated with one or more other requests, wherein the updated policy container is selectively distributed to the plurality of mesh agents to locally cause further actions, including:

determining one or more updated policies based on the updated policy container and another declared definition for relevancy of the other activity that is based on one or more of another local requirement or another local circumstance; and validating the one or more other requests based on the one or more updated policies included in the updated policy container, wherein the one or more other validated requests are forwarded to the resource via the overlay network.

2. The method of claim 1, further comprising:

updating the policy container at an infrastructure security computer that is separate from the first mesh agent and separate from the resource based on one or more of a rule or a user input; and communicating the updated policy container to the first mesh agent and each of the plurality of mesh agents.

3. The method of claim 1, wherein authentication of the identity, further comprises:

communicating one or more credentials associated with the entity that corresponds to the identity to an infrastructure security computer associated with the overlay network; and verifying that the one or more credentials are associated with the entity and with a privilege to access the overlay network and another privilege to access the resource.

4. The method of claim 1, wherein validating the one or more requests, further comprises:

determining one or more credentials associated with the entity, wherein the one or more credentials enable the entity to access the overlay network;

determining a set of acceptable credentials associated with the one or more policies; and in response to the one or more credentials being absent from the set of acceptable credentials, invalidating the one or more requests.

5. A network computer for managing access to a plurality of network resources, comprising:

a memory that stores at least instructions; and one or more processors that execute instructions that are configured to cause actions, including:

determining a first mesh agent on a logical edge of an overlay network that is configured to provide a client with access via a secure tunnel provided by the overlay network that includes a plurality of mesh agents;

determining a route for a connection in the overlay network for one or more requests to access a resource from the client that is received by the first mesh agent, wherein a last mesh agent in the route is configured to provide access to the resource over the connection;

employing the first mesh agent to determine an identity and an activity associated with the one or more requests based on network traffic, wherein the identity corresponds to an entity that is authenticated to access the overlay network and the resource, and wherein the activity corresponds to one or more of an application or an application protocol that is operative or available in the overlay network;

determining a policy container that is associated with the activity and based on one or more characteristics of the one or more requests by performance of further actions, including:

determining the application protocol associated with the one or more requests based on a payload included in the one or more requests;

parsing the payload based on the application protocol;

determining a portion of the one or more policies associated with the parsed payload based on the identity and one or more of a protocol fragment, a regular expression, or a rule; and executing one or more actions associated with the portion of the one or more policies to validate the one or more requests;

wherein the policy container includes one or more policies that are associated with a declared definition for relevancy of the activity that is based on one or more of a local requirement or a local circumstance; and distributing the policy container to the plurality of mesh agents for validation of the one or more requests based on the one or more policies included in the policy container associated with the activity, wherein the one or more validated requests are forwarded to the resource and one or more invalidated requests are discarded, and wherein persistence of the connection is maintained during the validation of the one or more requests; and updating the policy container with an association with another activity that is associated with one or more other requests, wherein the updated policy container is selectively distributed to the plurality of mesh agents to locally cause further actions, including:

determining one or more updated policies based on the updated policy container and another declared definition for relevancy of the other activity that is based on one or more of another local requirement or another local circumstance; and validating the one or more other requests based on the one or more updated policies included in the updated policy container, wherein the one or more other validated requests are forwarded to the resource via the overlay network.

6. The network computer of claim 5, wherein the one or more processors execute instructions that are configured to cause actions, further comprising:

updating the policy container at an infrastructure security computer that is separate from the first mesh agent and separate from the resource based on one or more of a rule or a user input; and communicating the updated policy container to the first mesh agent and each of the plurality of mesh agents.

7. The network computer of claim 5, wherein authentication of the identity, further comprises:

communicating one or more credentials associated with the entity that corresponds to the identity to an infrastructure security computer associated with the overlay network; and verifying that the one or more credentials are associated with the entity and with a privilege to access the overlay network and another privilege to access the resource.

8. The network computer of claim 5, wherein validating the one or more requests, further comprises:

determining one or more credentials associated with the entity, wherein the one or more credentials enable the entity to access the overlay network;

determining a set of acceptable credentials associated with the one or more policies; and in response to the one or more credentials being absent from the set of acceptable credentials, invalidating the one or more requests.

9. A processor readable non-transitory storage media that includes instructions configured for managing access to a plurality of network resources over a network, wherein execution of the instructions by one or more processors on one or more network computers performs actions, comprising:

determining a first mesh agent on a logical edge of an overlay network that is configured to provide a client with access via a secure tunnel provided by the overlay network that includes a plurality of mesh agents;

determining a route for a connection in the overlay network for one or more requests to access a resource from the client that is received by the first mesh agent, wherein a last mesh agent in the route is configured to provide access to the resource over the connection;

employing the first mesh agent to determine an identity and an activity associated with the one or more requests based on network traffic, wherein the identity corresponds to an entity that is authenticated to access the overlay network and the resource, and wherein the activity corresponds to one or more of an application or an application protocol that is operative or available in the overlay network;

determining a policy container that is associated with the activity and based on one or more characteristics of the one or more requests by performance of further actions, including:

determining the application protocol associated with the one or more requests based on a payload included in the one or more requests;

parsing the payload based on the application protocol;

determining a portion of the one or more policies associated with the parsed payload based on the identity and one or more of a protocol fragment, a regular expression, or a rule; and executing one or more actions associated with the portion of the one or more policies to validate the one or more requests; wherein the policy container includes one or more policies that are associated with a declared definition for relevancy of the activity that is based on one or more of a local requirement or a local circumstance; and distributing the policy container to the plurality of mesh agents for validation of the one or more requests based on the one or more policies included in the policy container associated with the activity, wherein the one or more validated requests are forwarded to the resource and one or more invalidated requests are discarded, and wherein persistence of the connection is maintained during the validation of the one or more requests; and updating the policy container with an association with another activity that is associated with one or more other requests, wherein the updated policy container is selectively distributed to the plurality of mesh agents to locally cause further actions, including:

determining one or more updated policies based on the updated policy container and another declared definition for relevancy of the other activity that is based on one or more of another local requirement or another local circumstance; and validating the one or more other requests based on the one or more updated policies included in the updated policy container, wherein the one or more other validated requests are forwarded to the resource via the overlay network.

10. The media of claim 9, wherein determining the policy container, further comprises:

determining the application protocol associated with the one or more requests based on a payload included in the one or more requests;

parsing the payload based on the application protocol;

determining a portion of the one or more policies associated with the parsed payload based on the identity and one or more of a protocol fragment, a regular expression, or a rule; and executing one or more actions associated with the portion of the one or more policies to validate the one or more requests.

11. The media of claim 9, further comprising:

updating the policy container at an infrastructure security computer that is separate from the first mesh agent and separate from the resource based on one or more of a rule or a user input; and communicating the updated policy container to the first mesh agent and each of the plurality of mesh agents.

12. The media of claim 9, wherein authentication of the identity, further comprises:

communicating one or more credentials associated with the entity that corresponds to the identity to an infrastructure security computer associated with the overlay network; and verifying that the one or more credentials are associated with the entity and with a privilege to access the overlay network and another privilege to access the resource.

13. The media of claim 9, wherein validating the one or more requests, further comprises:

determining one or more credentials associated with the entity, wherein the one or more credentials enable the entity to access the overlay network;

determining a set of acceptable credentials associated with the one or more policies; and in response to the one or more credentials being absent from the set of acceptable credentials, invalidating the one or more requests.

14. A system for managing access to network resources, comprising:

a network computer, comprising:

a memory that stores at least instructions; and one or more processors that execute instructions that are configured to cause actions, including:

determining a first mesh agent on a logical edge of an overlay network that is configured to provide a client with access via a secure tunnel provided by the overlay network that includes a plurality of mesh agents;

determining a route for a connection in the overlay network for one or more requests to access a resource from the client that is received by the first mesh agent, wherein a last mesh agent in the route is configured to provide access to the resource over the connection;

employing the first mesh agent to determine an identity and an activity associated with the one or more requests based on network traffic, wherein the identity corresponds to an entity that is authenticated to access the overlay network and the resource, and wherein the activity corresponds to one or more of an application or an application protocol that is operative or available in the overlay network;

determining a policy container that is associated with the activity and based on one or more characteristics of the one or more requests by performance of further actions, including:

determining the application protocol associated with the one or more requests based on a payload included in the one or more requests;

parsing the payload based on the application protocol;

determining a portion of the one or more policies associated with the parsed payload based on the identity and one or more of a protocol fragment, a regular expression, or a rule; and executing one or more actions associated with the portion of the one or more policies to validate the one or more requests; wherein the policy container includes one or more policies that are associated with a declared definition for relevancy of the activity that is based on one or more of a local requirement or a local circumstance; and distributing the policy container to the plurality of mesh agents for validation of the one or more requests based on the one or more policies included in the policy container associated with the activity, wherein the one or more validated requests are forwarded to the resource and one or more invalidated requests are discarded, and wherein persistence of the connection is maintained during the validation of the one or more requests; and updating the policy container with an association with another activity that is associated with one or more other requests, wherein the updated policy container is selectively distributed to the plurality of mesh agents to locally cause further actions, including:

determining one or more updated policies based on the updated policy container and another declared definition for relevancy of the other activity that is based on one or more of another local requirement or another local circumstance; and validating the one or more other requests based on the one or more updated policies included in the updated policy container, wherein the one or more other validated requests are forwarded to the resource via the overlay network.

15. The system of claim 14, wherein determining the policy container, further comprises:

determining the application protocol associated with the one or more requests based on a payload included in the one or more requests;

parsing the payload based on the application protocol;

determining a portion of the one or more policies associated with the parsed payload based on the identity and one or more of a protocol fragment, a regular expression, or a rule; and executing one or more actions associated with the portion of the one or more policies to validate the one or more requests.

16. The system of claim 14, wherein the one or more processors of the network computer execute instructions that are configured to cause actions, further comprising:

updating the policy container based on one or more of a rule or a user input; and communicating the updated policy container to the first mesh agent and each of the plurality of mesh agents.

17. The system of claim 14, wherein authentication of the identity, further comprises:

communicating one or more credentials associated with the entity that corresponds to the identity to an infrastructure security computer associated with the overlay network; and verifying that the one or more credentials are associated with the entity and with a privilege to access the overlay network and another privilege to access the resource.

18. The system of claim 14, wherein validating the one or more requests, further comprises:

determining one or more credentials associated with the entity, wherein the one or more credentials enable the entity to access the overlay network;

determining a set of acceptable credentials associated with the one or more policies; and in response to the one or more credentials being absent from the set of acceptable credentials, invalidating the one or more requests.

* * * * *